US011985053B2

(12) United States Patent
Cohen

(10) Patent No.: US 11,985,053 B2
(45) Date of Patent: May 14, 2024

(54) DETERMINING AN END USER EXPERIENCE SCORE BASED ON CLIENT DEVICE, NETWORK, SERVER DEVICE, AND APPLICATION METRICS

(71) Applicant: VIAVI Solutions Inc., San Jose, CA (US)

(72) Inventor: Steve Cohen, Chanhassen, MN (US)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

(21) Appl. No.: 17/648,021

(22) Filed: Jan. 14, 2022

(65) Prior Publication Data

US 2022/0141109 A1 May 5, 2022

Related U.S. Application Data

(63) Continuation-in-part of application No. 17/303,157, filed on May 21, 2021, which is a continuation of (Continued)

(51) Int. Cl.
*H04L 43/04* (2022.01)
*H04L 43/065* (2022.01)
(Continued)

(52) U.S. Cl.
CPC .......... *H04L 43/0864* (2013.01); *H04L 43/04* (2013.01); *H04L 43/065* (2013.01); *H04L 67/535* (2022.05)

(58) Field of Classification Search
CPC .......................... H04L 43/0864; H04L 67/535
(Continued)

(56) References Cited

U.S. PATENT DOCUMENTS 6,857,020 B1 * 2/2005 Chaar .................... G06Q 10/10
709/224
8,849,994 B2  9/2014 Roberts et al.
(Continued)

FOREIGN PATENT DOCUMENTS

CA        2446091 C  *  8/2012  .........  H04L 41/5003

OTHER PUBLICATIONS

New Relic, "Apdex: Measuring User Satisfaction," https://docs.newrelic.com/docs/apm/new-relic-apm/apdex/apdex-measuring-user-satisfication, 2008-2018, 4 pages.

*Primary Examiner* — Sibte H Bukhari
(74) *Attorney, Agent, or Firm* — Harrity & Harrity, LLP

(57) ABSTRACT

A device may receive client delay metrics associated with a client device of a network, network delay metrics associated with the network, server delay metrics associated with a server device of the network, and application delay metrics associated with an application provided by the server device. The device may calculate passive and active client delay scores based on the client delay metrics and the application delay metrics, and may calculate passive and active network delay scores based on the network delay metrics. The device may calculate passive and active server delay scores based on the server delay metrics and the application delay metrics, and may calculate passive and active application delay scores based on the application delay metrics. The device may calculate an end user experience score based on the scores, and may perform actions based on the end user experience score.

20 Claims, 11 Drawing Sheets

Related U.S. Application Data application No. 15/940,278, filed on Mar. 29, 2018, now Pat. No. 11,018,967.

(51) Int. Cl.
*H04L 43/0864* (2022.01)
*H04L 67/50* (2022.01)

(58) Field of Classification Search
USPC .......................................................... 709/224
See application file for complete search history.

(56) References Cited

U.S. PATENT DOCUMENTS

| | | | |
|---|---|---|---|
| 10,313,211 B1 * | 6/2019 | Rastogi | ................. H04L 41/142 |
| 11,018,967 B2 | 5/2021 | Cohen et al. | |
| 2009/0228585 A1 | 9/2009 | Kosbab et al. | |
| 2019/0086988 A1 * | 3/2019 | He | ........................ G06F 1/3212 |
| 2019/0239101 A1 * | 8/2019 | Ouyang | ................. G06N 3/084 |
| 2019/0349426 A1 | 11/2019 | Smith et al. | |
| 2019/0373331 A1 | 12/2019 | Benzatti et al. | |
| 2021/0328895 A1 | 10/2021 | Cohen et al. | |

\* cited by examiner

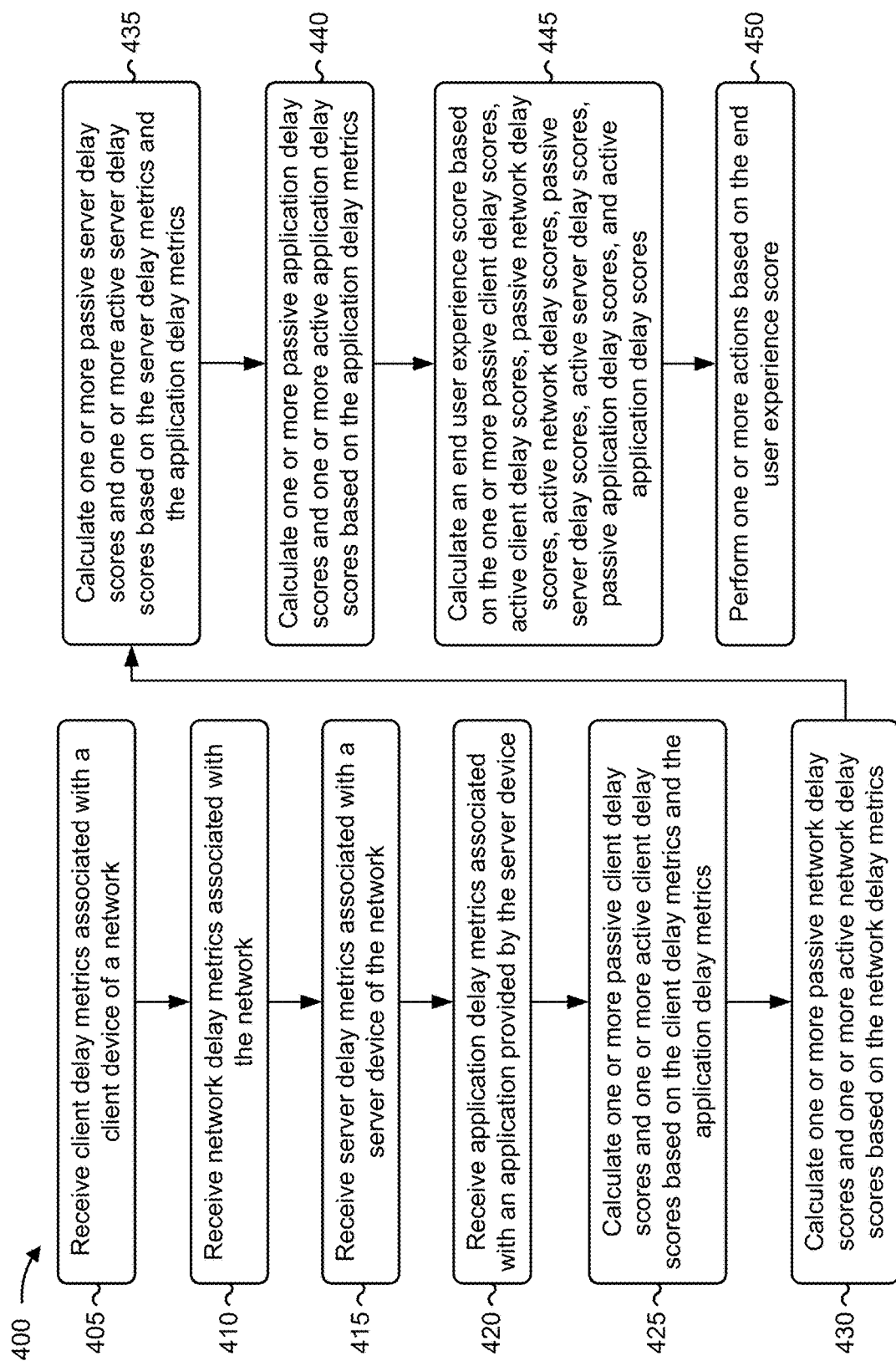

DETERMINING AN END USER
EXPERIENCE SCORE BASED ON CLIENT
DEVICE, NETWORK, SERVER DEVICE, AND
APPLICATION METRICS

RELATED APPLICATIONS

This patent application is a continuation-in-part of U.S. patent application Ser. No. 17/303,157, filed on May 21, 2021, and entitled "DETERMINING AN END USER EXPERIENCE SCORE BASED ON CLIENT DEVICE, NETWORK, SERVER DEVICE, AND APPLICATION METRICS," which is a continuation of U.S. patent application Ser. No. 15/940,278, filed on Mar. 29, 2018 (now U.S. Pat. No. 11,018,967), and entitled "DETERMINING AN END USER EXPERIENCE SCORE BASED ON CLIENT DEVICE, NETWORK, SERVER DEVICE, AND APPLICATION METRICS." The disclosures of the prior Applications are considered part of and are incorporated by reference into this patent application.

BACKGROUND

End user experience (EUE) monitoring enables monitoring impacts of device, network, and/or application performance from a point of view of an end user. Some metrics that are used for estimating EUE quality include a round-trip network delay (RTND) metric, an application delay metric, a data delivery time metric, a retransmissions metric, a zero windows metric, and/or the like. However, each of these metrics may not be useful for estimating EUE quality.

SUMMARY

Some implementations described herein relate to a method. The method may include receiving client delay metrics associated with a client device of a network, and receiving network delay metrics associated with the network. The method may include receiving server delay metrics associated with a server device of the network, and receiving application delay metrics associated with an application provided by the server device. The method may include calculating one or more passive client delay scores and one or more active client delay scores based on the client delay metrics and the application delay metrics, and calculating one or more passive network delay scores and one or more active network delay scores based on the network delay metrics. The method may include calculating one or more passive server delay scores and one or more active server delay scores based on the server delay metrics and the application delay metrics, and calculating one or more passive application delay scores and one or more active application delay scores based on the application delay metrics. The method may include calculating an end user experience score based on the one or more passive client delay scores, the one or more active client delay scores, the one or more passive network delay scores, the one or more active network delay scores, the one or more passive server delay scores, the one or more active server delay scores, the one or more passive application delay scores, and the one or more active application delay scores. The method may include performing one or more actions based on the end user experience score.

Some implementations described herein relate to a device. The device may include one or more memories and one or more processors coupled to the one or more memories. The one or more processors may be configured to receive client delay metrics associated with a client device of a network, and receive network delay metrics associated with the network. The one or more processors may be configured to receive server delay metrics associated with a server device of the network, and receive application delay metrics associated with an application provided by the server device. The one or more processors may be configured to calculate one or more passive client delay scores and one or more active client delay scores based on the client delay metrics and the application delay metrics, and calculate one or more passive network delay scores and one or more active network delay scores based on the network delay metrics. The one or more processors may be configured to calculate one or more passive server delay scores and one or more active server delay scores based on the server delay metrics and the application delay metrics, and calculate one or more passive application delay scores and one or more active application delay scores based on the application delay metrics. The one or more processors may be configured to calculate an end user experience score based on the one or more passive client delay scores, the one or more active client delay scores, the one or more passive network delay scores, the one or more active network delay scores, the one or more passive server delay scores, the one or more active server delay scores, the one or more passive application delay scores, and the one or more active application delay scores. The one or more processors may be configured to provide the end user experience score for display.

Some implementations described herein relate to a non-transitory computer-readable medium that stores a set of instructions for a device. The set of instructions, when executed by one or more processors of the device, may cause the device to receive client delay metrics associated with a client device of a network, and receive network delay metrics associated with the network. The set of instructions, when executed by one or more processors of the device, may cause the device to receive server delay metrics associated with a server device of the network, and receive application delay metrics associated with an application provided by the server device. The set of instructions, when executed by one or more processors of the device, may cause the device to calculate one or more passive client delay scores and one or more active client delay scores based on the client delay metrics and the application delay metrics, and calculate one or more passive network delay scores and one or more active network delay scores based on the network delay metrics. The set of instructions, when executed by one or more processors of the device, may cause the device to calculate one or more passive server delay scores and one or more active server delay scores based on the server delay metrics and the application delay metrics, and calculate one or more passive application delay scores and one or more active application delay scores based on the application delay metrics. The set of instructions, when executed by one or more processors of the device, may cause the device to calculate an end user experience score based on the one or more passive client delay scores, the one or more active client delay scores, the one or more passive network delay scores, the one or more active network delay scores, the one or more passive server delay scores, the one or more active server delay scores, the one or more passive application delay scores, and the one or more active application delay scores. The set of instructions, when executed by one or more processors of the device, may cause the device to modify one or more of the client device, the network, the server device, or the application based on the end user experience score.

BRIEF DESCRIPTION OF THE DRAWINGS

FIG. 4 is a flowchart of an example process for determining an EUE score based on client device, network, server device, and application metrics.

DETAILED DESCRIPTION

Figure 1A:
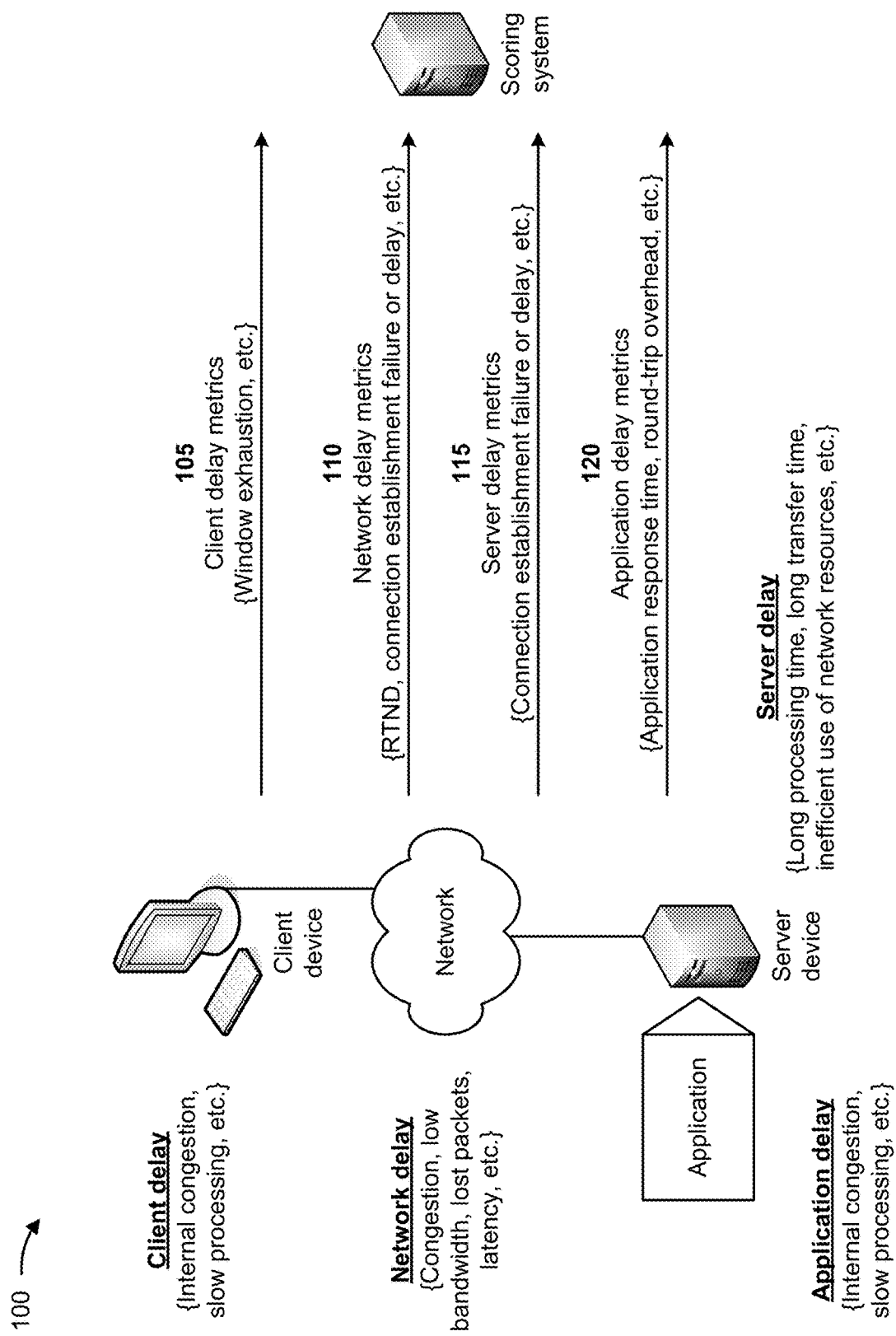
FIGS. 1A-1H are diagrams of an example implementation described herein.

The following detailed description of example implementations refers to the accompanying drawings. The same reference numbers in different drawings may identify the same or similar elements.

A RTND metric may not be useful for estimating EUE quality since large network latency alone may not be correctable, and may be partially compensated for by large transmission control protocol (TCP) windows or better application implementation. An application delay metric may not be useful for estimating EUE quality since an end user may expect an application delay, and the application delay may not provide an indication that differentiates between server device congestion, server device processing, and back-end processing. A data delivery time metric may not be useful for estimating EUE quality since an end user may expect a data delivery time delay, and the data delivery time delay does not provide an indication of whether a data delivery time is degraded. A retransmissions metric may not be useful for estimating EUE quality since retransmissions are a normal part of TCP flow control and an end user will not be aware of lost packets caused by retransmissions. A zero windows metric may not be useful for estimating EUE quality since congestion control may render the zero windows metric useless.

The current metrics used for estimating EUE quality (e.g., the RTND metric, the application delay metric, the data delivery time metric, the retransmissions metric, the zero windows metric, and/or the like) do not provide an indication of a cause of EUE quality degradation. For example, the current metrics do not provide an indication of whether the EUE quality degradation is caused by a client device, a server device communicating with the client device, an application executing on the server device and being utilized by the client device, or a network interconnecting the client device and the server device.

Therefore, current techniques for estimating EUE quality consume computing resources (e.g., processing resources, memory resources, communication resources, and/or the like), networking resources, and/or the like associated with utilizing useless metrics to incorrectly estimate EUE quality; utilizing an incorrectly estimated EUE quality to incorrectly modify a client device, a server device, an application, and/or a network; further degrading the EUE quality based on utilizing the incorrectly estimated EUE quality; and/or the like.

Some implementations described herein relate to a scoring system that determines an EUE score based on client device, network, server device, and application metrics. For example, the scoring system may receive client delay metrics associated with a client device of a network, network delay metrics associated with the network, server delay metrics associated with a server device of the network, and application delay metrics associated with an application provided by the server device. The scoring system may calculate passive and active client delay scores based on the client delay metrics and the application delay metrics, and may calculate passive and active network delay scores based on the network delay metrics. The scoring system may calculate passive and active server delay scores based on the server delay metrics and the application delay metrics, and may calculate passive and active application delay scores based on the application delay metrics. The scoring system may calculate a EUE score based on the passive and active client delay scores, the passive and active network delay scores, the passive and active server delay scores, and the passive and active application delay scores, and may perform actions based on the EUE score.

The passive scores described herein are generated based on passive monitoring (e.g., from probes), and the active scores described are generated based on active monitoring (e.g., via active or synthetic testing). Passive monitoring looks at real user traffic and measures the end user experience. Active testing simulates user interactions with services, devices, networks, and/or the like, and measures experience and/or performance, similar to how a human might evaluate an experience. Active testing may be useful when a cost of passive monitoring is a major limiter, passive monitoring is impossible (e.g., not having control of users or services, and wanting to understand a performance from each region where users are located), users do not utilize a service all the time, but want to determine if a system ever goes offline or performs poorly for certain use cases, and/or the like. Implementations described herein provide seamless EUE score reporting and workflows regardless of whether the inputs were provided by passive sources, active sources, or both types of sources.

In this way, the scoring system determines an EUE score based on client device, network, server device, and application metrics. The scoring system may calculate passive client device delay scores, passive network delay scores, passive server device delay scores, and passive application scores based on passive (e.g., packet-based) metrics, and may calculate a final passive score based on the passive client device delay scores, the passive network delay scores, the passive server device delay scores, and the passive application scores. The scoring system may calculate active client device delay scores, active network delay scores, active server device delay scores, and active application scores based on active metrics, and may calculate a final active score based on the active client device delay scores, the active network delay scores, the active server device delay scores, and the active application scores. The scoring system may calculate an EUE score based on the final passive score and the final active score, and may modify the client device, the network, the server device, and/or the application based on the EUE score. This, in turn, conserves computing resources, networking resources, and/or the like that would otherwise have been consumed in utilizing useless metrics to incorrectly estimate EUE quality; utilizing an incorrectly estimated EUE quality to incorrectly modify a client device, a server device, an application, and/or a network; further degrading the EUE quality based on utilizing the incorrectly estimated EUE quality; and/or the like.

FIGS. 1A-1H are diagrams of an example 100 associated with determining an EUE score based on client device, network, server device, and application metrics. As shown in FIGS. 1A-1H, the example 100 includes a client device, a network, an application, and a server device (e.g., executing the application) associated with a scoring system. The client device may communicate with the server device and the application, via the network. Further details of the client device, the network, the application, the server device, and the scoring system are provided elsewhere herein.

As shown in FIG. 1A, events may occur that cause delays at the client device and diminish an end user experience (e.g., of a user of the client device). For example, the client device may experience events, such as internal processing congestion, slow processing (e.g., signaled by a zero window, which is when a window size in the client device remains at zero for a specified amount of time and the client device is not able to receive further information), and/or the like. In some implementations, a zero window may occur when the window size never reaches zero, and the scoring system may utilize times when the window size does not reach zero but reaches a low value that inhibits another end (e.g., the client device or the server device) from sending more data.

In some implementations, the application may be spread across multiple load-balanced server devices and/or may be provided in the client device. In some implementations, the client device may include front end applications, such as, a file transfer protocol (FTP) application, a storage area network (SAN) application, and/or the like. In such implementations, if the SAN application encounters degradation, the application may experience delay.

As further shown in FIG. 1A, events may occur that cause delays in the network and diminish the end user experience. For example, the network may experience events, such as network congestion, low bandwidth in the network, lost packets in the network, latency in the network, and/or the like. As further shown in FIG. 1A, events may occur that cause delays at the server device and diminish the end user experience. For example, the server device may experience events, such as internal processing congestion, slow processing (e.g., signaled by a zero window, described elsewhere herein), and/or the like. As further shown in FIG. 1A, events may occur that cause delays associated with the application and diminish the end user experience. For example, the application may experience events, such as long processing time by the application, long transfer time associated with the application, inefficient use of network resources by the application, and/or the like.

As further shown in FIG. 1A, and by reference number 105, the scoring system may receive (e.g., from network probes) client delay metrics associated with the client device. For example, network probes may receive network packets associated with the client device, the server device, the network, and/or the application, and may calculate the client delay metrics based on the network packets, timing information associated with the packets, inter-arrival times associated with the packets, times between specifically identified packets, and/or the like. In such implementations, the scoring system may receive the client delay metrics from the network probes.

The client delay metrics may include metrics that provide indications of the client delay experienced at the client device. For example, the client delay metrics may include a window exhaustion metric, a bulk data transfer exhausted window metric, a bulk data transfer time metric, and/or the like. The window exhaustion metric may include a quantity of packet delays that can be attributed to exhausted or zero windows (e.g., when a window size in the client device remains at zero for a specified amount of time and the client device is not able to receive further information). The exhausted window delays may accumulate when packet deltas exceed a predetermined time (e.g., ten milliseconds), a connection is in an established bulk data transfer period, and the connection is in a low window size state (e.g., less than 25% of a maximum). In some implementations, the window exhaustion metric may include a metric that determines if a window of the client device is perceived by the server device to be zero or near zero by adjusting for network delays and projecting how many bytes have been transmitted since a last window indication from the client device would have reached the server device. A similar approach may be applied to the transfer opportunity delay metric, described elsewhere herein.

The bulk data transfer exhausted window metric may include a total time, during a bulk data transfer time, when two packets are transmitted in one direction for greater than the predetermined time (e.g., ten milliseconds) and under a low or zero window state. A connection may enter a low or zero window state when a reported receive window size drops below 25% of the low window size state. The bulk data transfer time metric may include a total of time periods of sustained data transfer (e.g., in milliseconds).

As further shown in FIG. 1A, and by reference number 110, the scoring system may receive (e.g., from network probes) network delay metrics associated with the network. For example, network probes may receive network packets associated with the client device, the server device, the network, and/or the application, and may calculate the network delay metrics, based on the network packets, timing information associated with the packets, inter-arrival times associated with the packets, times between specifically identified packets, and/or the like. In such implementations, the scoring system may receive the network delay metrics from the network probes.

The network delay metrics may include metrics that provide indications of the network delay experienced in the network. For example, the network delay metrics may include an RTND metric, a connections metric, a connection establishment failure count metric, a connection establishment failure time metric, a connection establishment delay time metric, a connection establishment delay count metric, a connection establishment delay (SynAckBeforeSyn) count metric, a retransmissions metric, a data transfer time metric, a data transfer retransmission time metric, a data transfer bytes metric, a retransmitted packets metric, a total packets metric, a data packets metric, and/or the like.

The RTND metric may include an observed minimum time for a packet to travel from one end of a connection and back. In such implementations, inter-packet times during connection setup and data-less acknowledgment (ACK) packets may be used to determine a minimum RTND. The connections metric may include a total quantity of connections used, in aggregate, to determine the RTND. The connection establishment failure count metric may include a quantity of connections to the server device that time out before seeing any data packets in either direction. The connection establishment failure time metric may include a total time between a first packet and a last identified packet for a failed connection (e.g., a connection to the server device that times out before seeing any data packets in either direction). The connection establishment delay time metric may include an amount of time to establish a connection (e.g., measured from a first synchronize (SYN) packet to a final ACK packet in a three-way handshake). The connection establishment delay count metric may include a quantity of established connections that satisfy the connection establishment delay time metric. The connection establishment delay SynAckBeforeSyn count metric may include a quantity of established connections where a SYN-ACK packet is identified before a SYN retransmission packet in the three-way handshake, and a quantity of established connections that include a single SYN packet.

The retransmissions metric may provide an indication of an impact of retransmitted packets on the network. The data transfer time metric may include a cumulative amount of time (e.g., in milliseconds) that a connection is delivering data packets (e.g., the amount time from a first data packet sent after an application turn to a last data packet or a data-less ACK packet from another direction). The data transfer retransmission time metric may be the same as the data transfer time metric but for intervals with one or more retransmitted data packets. The data transfer bytes metric may include a quantity of data transfer bytes for data transfer time intervals with retransmitted packets. The retransmitted packets metric may include a total quantity of retransmitted data packets for intervals identified by the data transfer retransmission time metric. The total packets metric may include a total quantity of data packets (e.g., including retransmitted data packets) for intervals identified by the data transfer retransmission time metric. The data packets metric may include a quantity of data packets for both directions between the server device and the client device.

As further shown in FIG. 1A, and by reference number 115, the scoring system may receive (e.g., from network probes) server delay metrics associated with the server device. For example, network probes may receive network packets associated with the client device, the server device, the network, and/or the application, and may calculate the server delay metrics based on the network packets, timing information associated with the packets, inter-arrival times associated with the packets, times between specifically identified packets, and/or the like. In such implementations, the scoring system may receive the server delay metrics from the network probes.

The server delay metrics may include metrics that provide indications of the server delay experienced at the server device. For example, the server delay metrics may include the window exhaustion metric, the bulk data transfer exhausted window metric, the bulk data transfer time metric, the connections metric, the connection establishment failure count metric, the connection establishment failure time metric, the connection establishment delay time metric, the connection establishment delay count metric, the connection establishment delay SynAckBeforeSyn count metric, and/or the like, as described elsewhere herein.

As further shown in FIG. 1A, and by reference number 120, the scoring system may receive (e.g., from network probes) application delay metrics associated with the application and/or the server device. For example, network probes may receive network packets associated with the client device, the server device, the network, and/or the application, and may calculate the application delay metrics based on the network packets, timing information associated with the packets, inter-arrival times associated with the packets, times between specifically identified packets, and/or the like. In such implementations, the scoring system may receive the application delay metrics from the network probes.

The application delay metrics may include metrics that provide indications of the application delay experienced at the application and/or the server device. For example, the application delay metrics may include an application response time metric, a total application turn delay metric, a total transaction time metric, the connections metric (described elsewhere herein), a high application turn rate metric, an application turn RTND total metric, an application data in-flight metric, a transfer opportunity delay metric, and/or the like.

The application response time metric may include a total amount of application delays (e.g., associated with the client device and the server device) occurring at a beginning application turn that acknowledges a maximum expected ACK packet in an opposite direction. The application response time metric may include a total transaction time from a first client device packet to a last server device packet. The total application turn delay metric may include a total amount of application delays associated with packets at a start of the client device or the server device application turn. The total transaction time metric may include a total of all application turn transaction time measurements, as measured from a first client device request packet to a last server device response packet. The high application turn rate metric may include a measure of an impact that the RTND has on a connection. The application turn RTND total metric may include a total of RTND for all recorded transactions. The application data in-flight metric may include an amount of time the application should have been keeping data in-flight (e.g., a delay caused by the application when the application could have used the network to transfer data). The transfer opportunity delay metric may include a total amount of time that data should have been kept in-flight by the application.

Figure 1B:
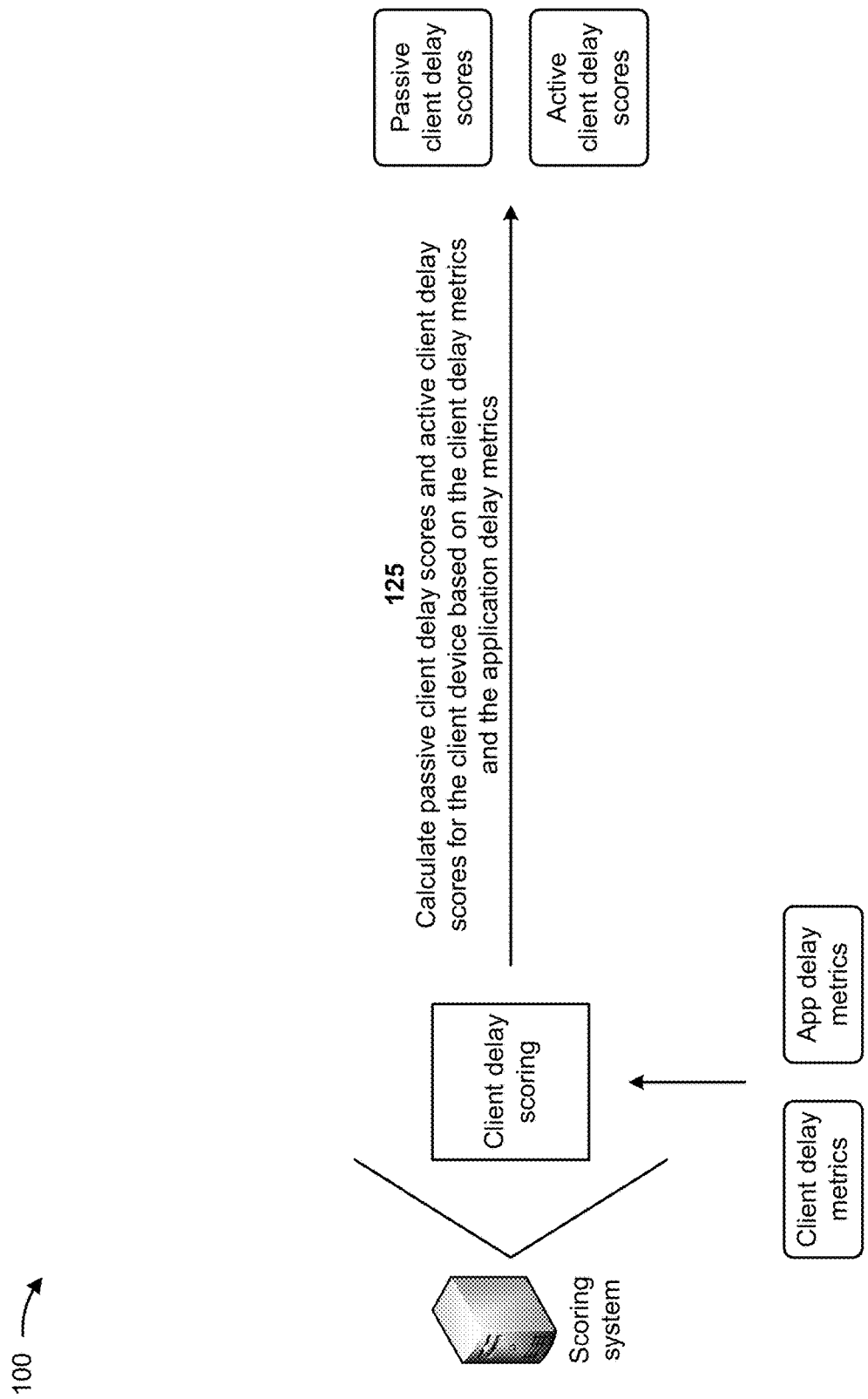

As shown in FIG. 1B, and by reference number 125, the scoring system may calculate passive client delay scores for the client device based on the client delay metrics and the application delay metrics. For example, the scoring system may utilize the window exhaustion metric, the bulk data transfer exhausted window metric, the bulk data transfer time metric, and/or the like, to calculate the passive client delay scores (e.g., a client exhausted windows score). The client exhausted windows score (e.g., shown as 0.1 in FIG. 1B) may provide a measure of delay associated with exhausted windows experienced by the client device.

The scoring system may assign a maximum value (e.g., 5.0) to the client exhausted windows score based on an effect of the score on the end user experience (e.g., as determined by the scoring system). In some implementations, the scoring system may calculate the client exhausted windows score when a particular value of the bulk data transfer exhausted window metric is greater than a threshold value (e.g., two, three, and/or the like seconds). The scoring system may utilize a scale value that is determined based on a percent ratio (e.g., determined by dividing the bulk data transfer exhausted window metric by the bulk data transfer time metric) when calculating the client exhausted windows score. The scale value may be in a range of zero (e.g., for a percent ratio of 20%) to one (e.g., for a percent ratio of 90%). The scoring system may multiply the maximum value (e.g., 5.0), of the client exhausted windows score, and the scale value (e.g., 0 to 1) to calculate the final client exhausted windows score (e.g., 0 to 5).

As further shown in FIG. 1B, and by reference number 125, the scoring system may calculate active client delay scores based on the client delay metrics and the application delay metrics. For example, the scoring system may utilize the window exhaustion metric, the bulk data transfer exhausted window metric, the bulk data transfer time metric, and/or the like, to calculate the active client delay scores. A substantial quantity of the client device delay, or a sharp increase of the client device delay, may indicate a poorly designed test, a slow or overloaded client device, the presence of malware on the client device, and/or the like. The active client delay scores may provide a measure of delays associated with the client device. The scoring system may utilize data from a client uniform resource locator (CURL) service (e.g., a command-line tool for receiving or sending data including files using URL syntax), a ping service, a traceroute service, a multi-step web service, other non-web test services, and/or the like to calculate the active client delay score. The data from the services may include a total client delay time, minimum round trip time (RTT) alarms, and/or the like.

The scoring system may utilize a first model (e.g., an absolute model) and a second model (e.g., an anomaly-based machine learning model) to calculate the active client delay scores. The first model may assign a maximum value (e.g., 7.0) to the active client delay score, may assign a minimum delay value (e.g., 4000 milliseconds (ms)), and may assign a maximum delay value (e.g., 60,000 ms) based on effects of the scores on the end user experience (e.g., as determined by the scoring system). The scoring system may calculate an average RTND by dividing the RTND metric by the connections metric. If the average RTND is greater than the maximum delay value (e.g., 60,000), the scoring system may assign the maximum value (e.g., 7.0) to the active client delay score. If the average RTND is less than the minimum delay value (e.g., 4000), the scoring system may assign a zero (0.0) value to the active client delay score. If the average RTND is greater than the minimum delay value (e.g., 4000) and less than the maximum delay value (e.g., 60,000), the scoring system may calculate the active client delay score as follows:

$$\text{Active client delay score} = \text{Max value} \times \frac{Avg\ RTND - \text{Min}\ RTND\ \text{value}}{\text{Max}\ RTND\ \text{value} - \text{Min}\ RTND\ \text{value}}.$$

With the second model, if a minimum RTT alarm has a good or indeterminate severity indicator or the total client delay time is less than a value (e.g., 50 ms), the scoring system may not increase the active client delay score. If the minimum RTT alarm has a severity warning, the scoring system may linearly or non-linearly increase the active delay score (e.g., from 0.0 to 5.0) based on a level of the severity warning. For example, if the total client delay time is less than 100 ms, the scoring system may not increase the active client delay score. If the total client delay time is in a range of 100 ms and 4000 ms, the scoring system may scale down an increase in the active client delay score with a multiplier (e.g., 0.0 to 0.6). If the total client delay time is in a range of 4000 ms and 60,000 ms, the scoring system may scale down an increase in the active client delay score with another multiplier (e.g., 0.6 to 1.0). If the minimum RTT alarm has severity critical, the scoring system may linearly or non-linearly increase the active client delay score (e.g., from 0.0 to 10.0) based on a level of the severity critical. For example, if the total client delay time is less than 50 ms, the scoring system may not increase the active client delay score. If the total client delay time is in a range of 50 ms and 4000 ms, the scoring system may scale down an increase in the active client delay score with a multiplier (e.g., 0.0 to 0.8). If the total client delay time is in a range of 4000 ms and 60,000 ms, the scoring system may scale down an increase in the active client delay score with another multiplier (e.g., 0.8 to 1.0). In some implementations, the scoring system may increase the active client delay score based on a maximum value determined by the first model or the second model (e.g., whichever is greatest).

Figure 1C:
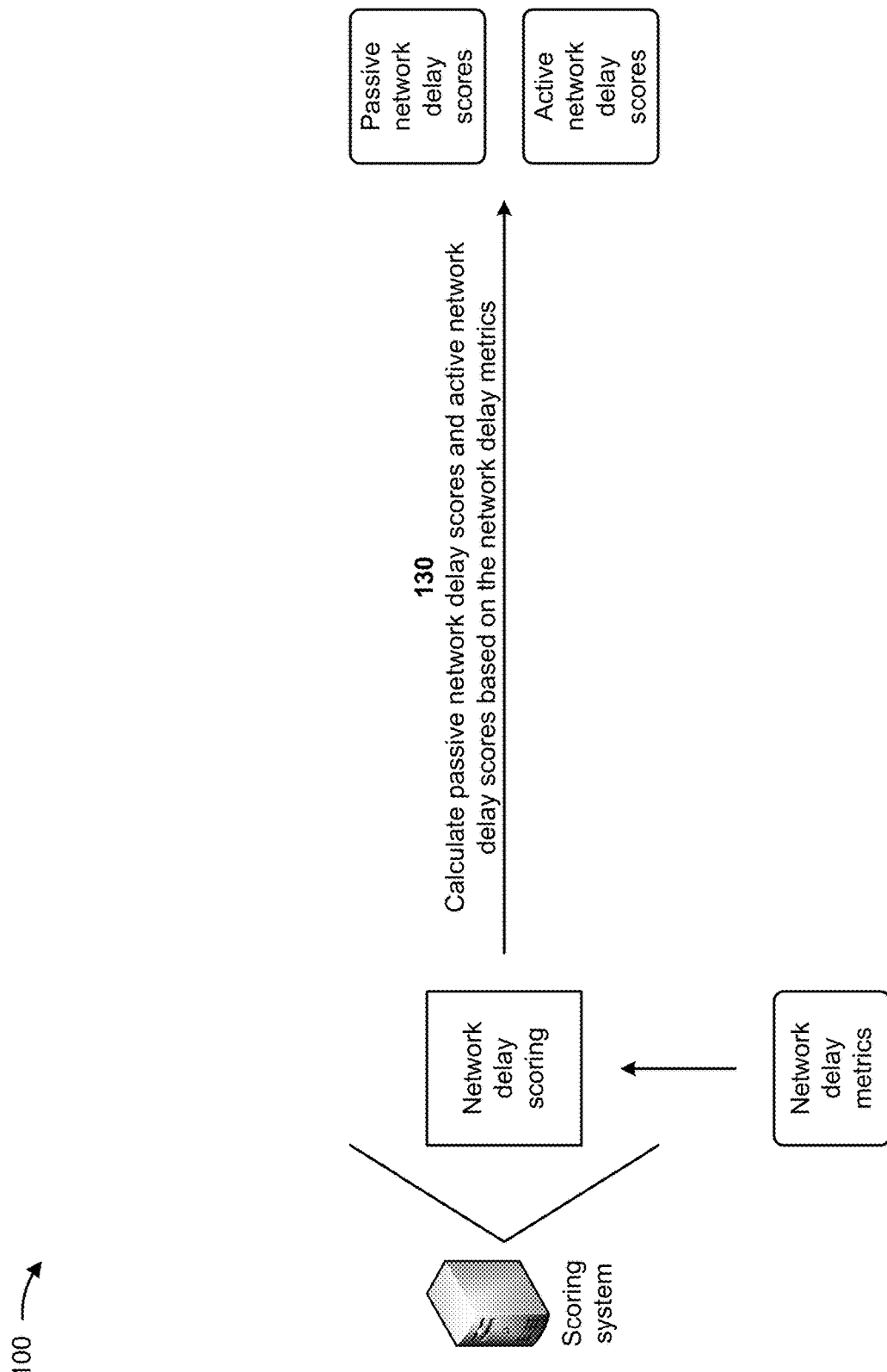

As shown in FIG. 1C, and by reference number 130, the scoring system may calculate passive network delay scores based on the network delay metrics. For example, the scoring system may calculate a network RTND score, a network connection establishment failure score, a network connection establishment delay score, a network retransmissions score, and/or a network slow data transfer rate score as the passive network delay scores. The scoring system may utilize the RTND metric, the connections metric, the connection establishment failure count metric, the connection establishment failure time metric, the connection establishment delay time metric, the connection establishment delay count metric, the connection establishment delay SynAck-BeforeSyn count metric, the retransmissions metric, the data transfer time metric, the data transfer bytes metric, the retransmitted packets metric, the total packets metric, the data packets metric, and/or the like, to calculate the network RTND score, the network connection establishment failure score, the network connection establishment delay score, the network retransmissions score, and/or the network slow data transfer rate score.

The network RTND score may provide a measure of an amount of time it takes a packet to travel from one end of a connection and back (e.g., from the server device, to the client device, and back to the server device). The scoring system may assign a maximum value (e.g., 2.0) to the network RTND score, may assign a minimum RTND value (e.g., 100), and may assign a maximum RTND value (e.g., 400) based on effects of the scores on the end user experience (e.g., as determined by the scoring system). The scoring system may calculate an average RTND by dividing the RTND metric by the connections metric. If the average RTND is greater than the maximum RTND value (e.g., 400), the scoring system may assign the maximum value (e.g., 2.0) to the network RTND score. If the average RTND is less than the minimum RTND value (e.g., 100), the scoring system may assign a zero (0.0) value to the network RTND score. If the average RTND is greater than the minimum RTND value (e.g., 100) and less than the maximum RTND value (e.g., 400), the scoring system may calculate the network RTND score as follows:

$$\text{Network}\ RTND\ \text{score} = \text{Max value} \times \frac{Avg\ RTND - \text{Min}\ RTND\ \text{value}}{\text{Max}\ RTND\ \text{value} - \text{Min}\ RTND\ \text{value}}.$$

The network connection establishment failure score may provide a measure of connections that never fully establish and have at least one SYN+ACK packet from the server device and no data packets between the client device and the server device. The scoring system may assign a maximum value (e.g., 10.0) to the network connection establishment failure score based on an effect of the score on the end user experience (e.g., as determined by the scoring system). The scoring system may determine the network connection establishment failure score based on a connection failure time. For example, if the connection failure time is within a predetermined range (e.g., 0.0 seconds to 0.5 seconds), the scoring system may assign a particular value (e.g., 5.0) to the network connection establishment failure score. If the connection failure time is greater than a predetermined time (e.g., 10 seconds), the scoring system may assign another particular value (e.g., 10.0) to the network connection establishment failure score. If the connection failure time is within another predetermined range (e.g., 0.5 seconds to 10 seconds), the scoring system may assign a linear or non-linear value (e.g., between 5.0 and 10.0), that linearly or non-linearly depends on the connection failure time (e.g., values of 5.0 and 10.0 correspond to connection failure times of 0.5 seconds and 10 seconds, respectively), to the network connection establishment failure score. The scoring system may scale the network connection establishment failure score downward based on a percentage of connections that failed. For example, the scoring system may multiply the network connection establishment failure score by a scaling factor (e.g., from 0.0 to 1.0, where 0.0 corresponds to 0.1% of connections that failed and 1.0 corresponds to 20% of connections that failed).

The network connection establishment delay score may be related to a connection establishment time. The scoring system may assign a maximum value (e.g., 4.0) to the network connection establishment delay score based on an effect of the score on the end user experience (e.g., as determined by the scoring system). The network establishment delay score may be attributed to the network when the server device sends a SYN-ACK packet followed by the client device sending a SYN packet (e.g., since the network may drop the SYN-ACK packet, which requires the client device to resend the SYN packet). The scoring system may assign a linear or non-linear value (e.g., between 0.0 and 4.0), that linearly or non-linearly depends on an average connection establishment time (e.g., values of 0.0 and 4.0 correspond to average connection establishment times of 500 milliseconds and 15,000 milliseconds, respectively), to the network connection establishment delay score. The scoring system may attribute the network connection establishment delay score to the network and the server device based on a percentage of connections that had SYN-ACK packets preceding a retransmitted SYN packet. The scoring system may multiply the network connection establishment delay score by a weighting factor (e.g., from 0.0 to 1.0).

The network retransmissions score may provide a measure of an impact of retransmissions on network throughput (e.g., on sustained data transfer rates of the network). The scoring system may assign a maximum value (e.g., 5.0) to the network retransmissions score based on an effect of the score on the end user experience (e.g., as determined by the scoring system). When the network has low latency and the scoring system determines that the RTND is low (e.g., less than one millisecond), a quantity of retransmissions is very high (e.g., greater than five retransmitted packets and more than 1% of the total packets are retransmitted packets), individual data transfer times are high (e.g., greater than two seconds), and throughput during transfer is low (e.g., less than 100 megabits per second (Mbps)), the scoring system may increase the network retransmissions score (e.g., based on the percent of the total packets that are retransmitted packets) up to the maximum value. When the network has high latency and the scoring system determines that the RTND is high (e.g., greater than or equal to one millisecond), the quantity of retransmissions is elevated (e.g., greater than five retransmitted packets and more than 0.01% of the total packets are retransmitted packets), individual data transfer times are high (e.g., greater than two seconds), and throughput during transfer is low (e.g., less than 10 Mbps), the scoring system may increase the network retransmissions score (e.g., based on the percent of the total packets that are retransmitted packets) up to the maximum value. If the scoring system determines that the server device is busy (e.g., a cause of the retransmissions), the scoring system may attribute some or all of the network retransmissions score to the server device.

The network slow data transfer rate score may provide a measure of slow data transfer by the network. Slow data transfer may be noticeable to end users if an amount of data being transferred is large, and may be caused by low bandwidth, high congestion, retransmissions, TCP slow start, TCP window exhaustion, and/or the like. The scoring system may assign a maximum value (e.g., 5.0) to the network slow data transfer rate score based on an effect of the score on the end user experience (e.g., as determined by the scoring system). The scoring system may calculate an average data transfer time (Avg_DTT) by dividing a data transfer time by a quantity of connections, and may calculate an average data transfer count by dividing a quantity of packets (e.g., provided in both directions between the server device and the client device) by the quantity of connections. The scoring system may calculate an average data transfer bytes by dividing the quantity of data transfer bytes (DTB), for data transfer time intervals with retransmitted packets, by the quantity of connections. The scoring system may calculate an achieved transfer rate (ATR) as follows:

$$ATR = DTB \times 8 / \text{Avg\_DTT} / 1000.$$

When the average data transfer time is greater than a value (e.g., two seconds), the average data transfer count is greater than or equal to a value (e.g., ten), and the average data transfer bytes is greater than or equal to a value (e.g., 10,000), the scoring system may assign a value (e.g., 0.0 to 5.0) to the network slow data transfer rate score. When the RTND is greater than a value (e.g., five milliseconds), the scoring system may determine that the network includes a slow transfer speed, may determine a minimum preferred transfer rate (PTR) (e.g., 10 Mbps), and may increase the network slow data rate score for any network speeds less than the minimum preferred transfer rate. When the RTND is less than a value (e.g., one millisecond), the scoring system may determine that the network includes a faster low-latency connection, may determine another minimum preferred transfer rate (e.g., 100 Mbps), and may increase the network slow data rate score for any network speeds less than the other minimum preferred transfer rate. When the RTND is greater than or equal to one millisecond and less than or equal to five milliseconds, the scoring system may use the following to calculate the minimum PTR:

$$PTR = \left(1 - \frac{(RTND - RTND2)}{RTND1 - RTND2}\right) * (PTR1 - PTR2) + PTR1,$$

where RTND1=5, RTND2=1, PTR1=10, and PTR2=100. Thus, the scoring system may calculate a minimum PTR, for a RTND of two, to be PTR(RTND=2)=(1−((2−1)/(5−1)))*(100−10)+10=77.5 Mbps, may calculate a minimum PTR, for a RTND of three, to be PTR(RTND=3)=(1−((3−1)/(5−1)))*(100−10)+10=55.0 Mbps, and may calculate a minimum PTR, for a RTND of four, to be PTR(RTND=4)=(1−((4−1)/(5−1)))*(100−10)+10=32.5 Mbps. Given a measured RTND, an achieved transfer rate (ATR), and a minimum preferred transfer rate (PTR) for a connection, the scoring system may calculate the network slow data transfer rate (NSDT) score as follows:

$$NSDT \text{ score} = \text{pow}\left(\frac{(PTR - ATR)}{PTR}, 4\right) * 5.0$$

For achieved transfer rate values greater than the minimum preferred transfer rate (e.g., ATR>PTR), the scoring system may not utilize the aforementioned equation and may set the network slow data transfer rate score to zero.

As further shown in FIG. 1C, and by reference number 130, the scoring system may calculate active network delay scores based on the network delay metrics. For example, the scoring system may calculate an active network connection establishment failure score, an active delay score, an active slow network for data transfer score, and/or an active network connection establishment delay score as the active network delay scores. The scoring system may utilize the RTND metric, the connections metric, the connection establishment failure count metric, the connection establishment failure time metric, the connection establishment delay time metric, the connection establishment delay count metric, the connection establishment delay SynAckBeforeSyn count metric, the retransmissions metric, the data transfer time metric, the data transfer bytes metric, the retransmitted packets metric, the total packets metric, the data packets metric, and/or the like, to calculate the active network connection establishment failure score, the active delay score, the active slow network for data transfer score, and/or the active network connection establishment delay score.

The active network connection establishment failure score may provide a measure of connection delays associated with the network and/or the server device. For example, at some point, the server device may become unreachable (e.g., if pings get through to the server device but the application is offline, or if the server device is nonoperational), and the active network connection establishment failure score may indicate that the server device is at fault rather than the network. The scoring system may utilize data from the cURL service, the ping service, the traceroute service, the multi-step web service, the firewall/flow logs service, and/or the like to calculate the active network connection establishment failure score. The data from the services may include received failure codes, codes indicating no failure, Boolean data indicating whether a ping or a traceroute last hop was successful, Boolean data indicating that a ping or a traceroute last hop has never been successful, and/or the like. For example, if a failure code indicates unreachable or that a timeout has occurred, the scoring system may not increase the active network connection establishment failure score. If both ping and traceroute (e.g., for a next to last hop and a last hop) have not responded, the scoring system may not increase the active network connection establishment failure score but may increase an active server connection establishment failure score (e.g., indicating that the server device or the application is at fault). If ping responded or traceroute (e.g., for the next to last hop or the last hop) responded, the scoring system may not increase the active network connection establishment failure score but may increase the active server connection establishment failure score (e.g., indicating that the server device or the application is at fault). In some implementations, since a failure code is fatal, the scoring system may increase the active server connection establishment failure score by a maximum quantity (e.g., 10.0).

The active delay score may provide a measure of delays associated with the network. For example, a significant increase in network delay is a noteworthy anomaly, and exceptionally high and sustained network delays are also noteworthy. An increase in network delay may be caused by network congestion, a change in a network path to the server device, a change to a location of the server device, additional redirects or other application changes that influence network path, and/or the like. The scoring system may utilize data from the cURL service, the ping service, the traceroute service, the multi-step web service, other non-web tests, and/or the like to calculate the active delay score. The data from the services may include a sum of minimum across redirects, a maximum of minimum across redirects, minimum RTT alarms, and/or the like.

The scoring system may utilize a first model (e.g., an absolute model) and a second model (e.g., an anomaly-based machine learning model) to calculate the active delay score. The first model may assign a maximum value (e.g., 3.0) to the active delay score, may assign a minimum RTND value (e.g., 200 ms), and may assign a maximum RTND value (e.g., 1400 ms) based on effects of the scores on the end user experience (e.g., as determined by the scoring system). The scoring system may calculate an average RTND by dividing the RTND metric by the connections metric. If the average RTND is greater than the maximum RTND value (e.g., 1400), the scoring system may assign the maximum value (e.g., 3.0) to the active delay score. If the average RTND is less than the minimum RTND value (e.g., 200), the scoring system may assign a zero (0.0) value to the active delay score. If the average RTND is greater than the minimum RTND value (e.g., 200) and less than the maximum RTND value (e.g., 1400), the scoring system may calculate the active delay score as follows:

$$\text{Active delay score} = \text{Max value} \times \frac{\text{Avg } RTND - \text{Min } RTND \text{ value}}{\text{Max } RTND \text{ value} - \text{Min } RTND \text{ value}}.$$

With the second model, if a minimum RTT alarm has a good or indeterminate severity indicator or the sum of minimum across redirects is less than a value (e.g., 10 ms), the scoring system may not increase the active delay score. If the minimum RTT alarm has a severity warning, the scoring system may linearly or non-linearly increase the active delay score (e.g., from 0.0 to 5.0) based on a level of the severity warning. For example, if the sum of minimum across redirects is less than 50 ms, the scoring system may not increase the active delay score. If the sum of minimum across redirects is in a range of 50 ms and 100 ms, the scoring system may scale down an increase in the active delay score with a multiplier (e.g., 0.0 to 0.8). If the sum of minimum across redirects is in a range of 100 ms and 200 ms, the scoring system may scale down an increase in the active delay score with another multiplier (e.g., 0.8 to 1.0). If the minimum RTT alarm has severity critical, the scoring system may linearly or non-linearly increase the active delay score (e.g., from 5.0 to 8.0) based on a level of the severity critical. For example, if the sum of minimum across redirects is less than 10 ms, the scoring system may not increase the active delay score. If the sum of minimum across redirects is in a range of 10 ms and 30 ms, the scoring system may scale down an increase in the active delay score with a multiplier (e.g., 0.0 to 0.8). If the sum of minimum across redirects is in a range of 30 ms and 400 ms, the scoring system may scale down an increase in the active delay score with another multiplier (e.g., 0.8 to 1.0). In some implementations, the scoring system may increase the active delay score based on a maximum value determined by the first model or the second model (e.g., whichever is greatest).

The active slow network for data transfer score may provide a measure of slow data transfer by the network. A significant increase in data transfer time is a noteworthy anomaly, and whether a data transfer is particularly slow and takes a long time is noteworthy. An increase in the data transfer time may be caused by packet loss, congestion, a substandard network link/path, a misconfigured network device, and/or the like. The scoring system may utilize data from the cURL service, the ping service, the traceroute service, the multi-step web service, other non-web tests, and/or the like to calculate the active delay score. The data from the services may include a sum of minimum across redirects, a maximum of minimum across redirects, minimum RTT alarms, and/or the like.

The scoring system may utilize a first model (e.g., an absolute model) and a second model (e.g., an anomaly-based machine learning model) to calculate the active slow network for data transfer score. The first model may perform similar calculations as utilized to calculate the slow network for data transfer score to calculate the active slow network for data transfer score. However, the first model may not increase the active slow network for data transfer score if a data transfer time is less than a minimum value (e.g., 4000 ms). If the data transfer time is from 4000 ms to 8000 ms, the first model may linearly or non-linearly increase the active slow network for data transfer score in accordance with the data transfer time to avoid thrashing.

With the second model, if a data transfer time alarm has a good or indeterminate severity indicator or the data transfer time is less than a value (e.g., 1000 ms), the scoring system may not increase the active slow network for data transfer score. If the data transfer time alarm has a severity warning, the scoring system may linearly or non-linearly increase the active slow network for data transfer score (e.g., from 0.0 to 5.0) based on a level of the severity warning. For example, if the data transfer time is less than 2000 ms, the scoring system may not increase the active slow network for data transfer score. If the data transfer time is in a range of 2000 ms and 8000 ms, the scoring system may scale down an increase in the active slow network for data transfer score with a multiplier (e.g., 0.0 to 0.6). If the data transfer time is in a range of 8000 ms and 60,000 ms, the scoring system may scale down an increase in the active delay score with another multiplier (e.g., 0.6 to 1.0). If the data transfer time alarm has severity critical, the scoring system may linearly or non-linearly increase the active slow network for data transfer score (e.g., from 5.0 to 10.0) based on a level of the severity critical. For example, if the data transfer time is less than 1000 ms, the scoring system may not increase the active slow network for data transfer score. If the data transfer time is in a range of 1000 ms and 8000 ms, the scoring system may scale down an increase in the active slow network for data transfer score with a multiplier (e.g., 0.0 to 0.8). If the data transfer time is in a range of 8000 ms and 60,000 ms, the scoring system may scale down an increase in the active slow network for data transfer score with another multiplier (e.g., 0.8 to 1.0). In some implementations, the scoring system may increase the active slow network for data transfer score based on a maximum value determined by the first model or the second model (e.g., whichever is greatest).

The active network connection establishment delay score may be related to a connection establishment time. The scoring system may assign a maximum value (e.g., 4.0) to the active network connection establishment delay score based on an effect of the score on the end user experience (e.g., as determined by the scoring system). The active network connection establishment delay score may be attributed to the network when the server device sends a SYN-ACK packet followed by the client device sending a SYN packet (e.g., since the network may drop the SYN-ACK packet, which requires the client device to resend the SYN packet). The scoring system may assign a linear or non-linear value (e.g., between 0.0 and 4.0), that linearly or non-linearly depends on an average connection establishment time (e.g., values of 0.0 and 4.0 correspond to average connection establishment times of 0.5 seconds and 15 seconds, respectively), to the active network connection establishment delay score. The scoring system may attribute the active network connection establishment delay score to the network based on a percentage of connections that had SYN-ACK packets preceding a retransmitted SYN packet.

Figure 1D:
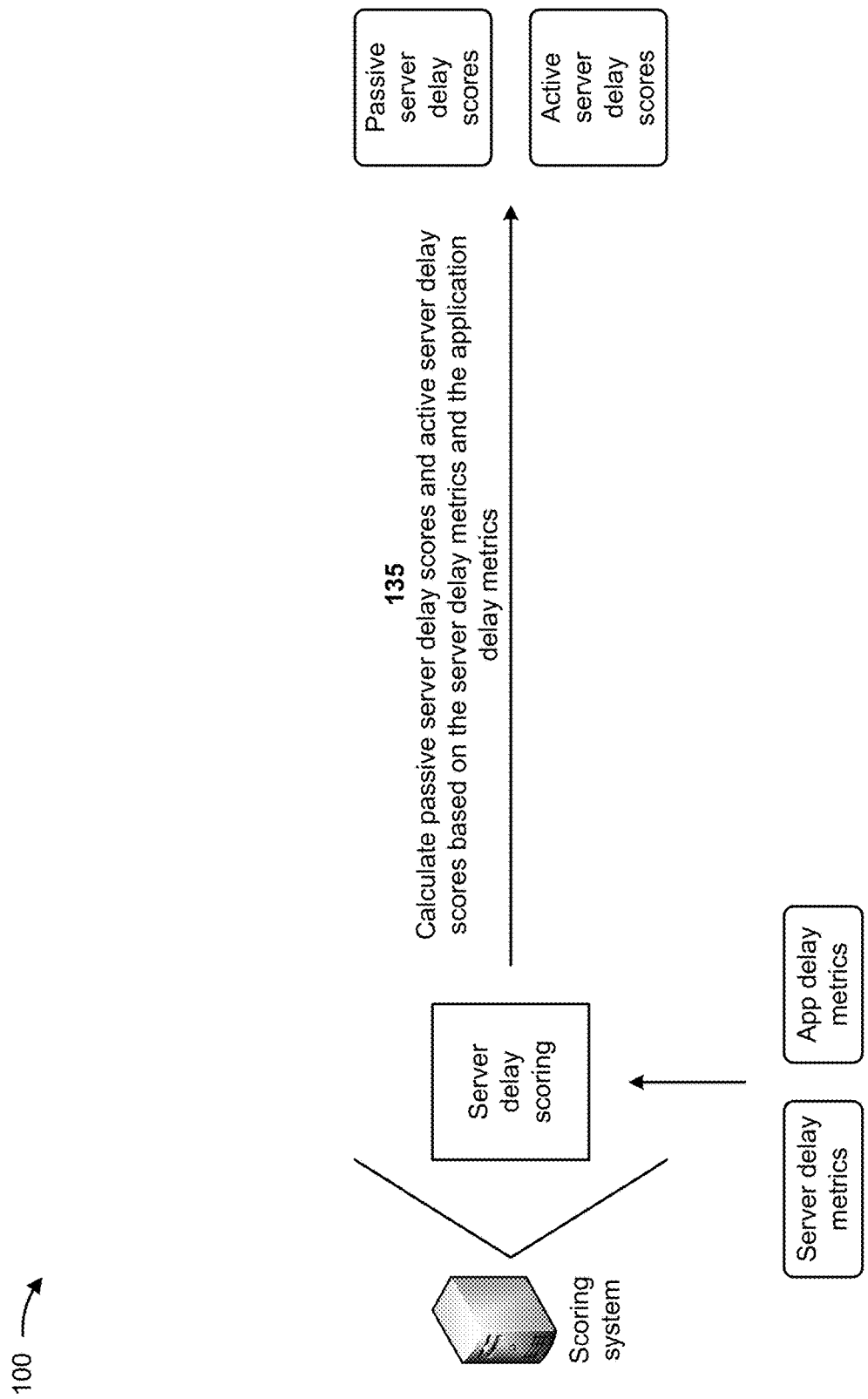

As shown in FIG. 1D, and by reference number 135, the scoring system may calculate passive server delay scores based on the server delay metrics and the application delay metrics. For example, the scoring system may calculate a server exhausted windows score, a server connection establishment failure score, and/or a server connection establishment delay score as the passive server delay scores. In some implementations, the scoring system may utilize the window exhaustion metric, the bulk data transfer exhausted window metric, the bulk data transfer time metric, the connections metric, the connection establishment failure count metric, the connection establishment failure time metric, the connection establishment delay time metric, the connection establishment delay count metric, the connection establishment delay SynAckBeforeSyn count metric, and/or the like, to calculate the server exhausted windows score, the server connection establishment failure score, and/or the server connection establishment delay score.

The scoring system may assign a maximum value (e.g., 5.0) to the server exhausted windows score based on an effect of the score on the end user experience (e.g., as determined by the scoring system). The scoring system may calculate the server exhausted windows score when a particular value of the bulk data transfer exhausted window metric is greater than a threshold value (e.g., two seconds). The scoring system may utilize a scale value that is determined based on a percent ratio (e.g., determined by dividing the bulk data transfer exhausted window metric by the bulk data transfer time metric) when calculating the server exhausted windows score. The scale value may be in a range of zero (e.g., for a percent ratio of 20%) to one (e.g., for a percent ratio of 90%). The scoring system may multiple the maximum value (e.g., 5.0), of the server exhausted windows score, and the scale value (e.g., 0 to 1) to calculate the final server exhausted windows score (e.g., 0 to 5).

The server connection establishment failure score may provide a measure of connections that never fully establish and have at least one SYN+ACK packet from the server device and no data packets between the client device and the server device. The scoring system may assign a maximum value (e.g., 2.0) to the server connection establishment failure score based on an effect of the score on the end user experience (e.g., as determined by the scoring system). The scoring system may determine the server connection establishment failure score based on a connection failure time. For example, if the connection failure time is within a predetermined range (e.g., 0.0 seconds to 0.5 seconds), the scoring system may assign a particular value (e.g., 0.0) to the server connection establishment failure score. If the connection failure time is greater than a predetermined time (e.g., 10 seconds), the scoring system may assign another particular value (e.g., 2.0) to the server connection establishment failure score. If the connection failure time is within another predetermined range (e.g., 0.5 seconds to 10 seconds), the scoring system may assign a linear or non-linear value (e.g., between 0.0 and 2.0), that linearly or non-linearly depends on the connection failure time (e.g., values of 0.0 and 2.0 correspond to connection failure times of 0.5 seconds and 10 seconds, respectively), to the server connection establishment failure score. The scoring system may scale the server connection establishment failure score downward based on a percentage of connections that failed. For example, the scoring system may multiply the server connection establishment failure score by a scaling factor (e.g., from 0.0 to 1.0, where 0.0 corresponds to 0.1% of connections that failed and 1.0 corresponds to 20% of connections that failed).

The server connection establishment delay score may be related to a connection establishment time. The scoring system may assign a maximum value (e.g., 4.0) to the server connection establishment delay score based on an effect of the score on the end user experience (e.g., as determined by the scoring system). The scoring system may assign a linear or non-linear value (e.g., between 0.0 and 4.0), that linearly or non-linearly depends on an average connection establishment time (e.g., values of 0.0 and 4.0 correspond to average connection establishment times of 500 milliseconds and 15,000 milliseconds, respectively), to the server connection establishment delay score. The scoring system may attribute the server connection establishment delay score to the network and the server device based on a percentage of connections that had SYN-ACK packets preceding a retransmitted SYN packet. The scoring system may multiply the server connection establishment delay score by a weighting factor (e.g., from 0.0 to 1.0).

As further shown in FIG. 1D, and by reference number 135, the scoring system may calculate active server delay scores based on the server delay metrics and the application delay metrics. For example, the scoring system may calculate an active server connection establishment failure score and/or an active delay score as the active server delay scores. The scoring system may utilize the window exhaustion metric, the bulk data transfer exhausted window metric, the bulk data transfer time metric, the connections metric, the connection establishment failure count metric, the connection establishment failure time metric, the connection establishment delay time metric, the connection establishment delay count metric, the connection establishment delay SynAckBeforeSyn count metric, and/or the like, to calculate the active server connection establishment failure score and/or the active delay score.

The active server connection establishment failure score may provide a measure of connection delays associated with the network and/or the server device. For example, the scoring system may utilize data from the cURL service, the ping service, the traceroute service, the multi-step web service, the other non-web test service, and/or the like to calculate the active server connection establishment failure score. The data from the services may include received failure codes, codes indicating no failure, Boolean data indicating whether a ping or a traceroute last hop was successful, Boolean data indicating that a ping or a traceroute last hop has never been successful, and/or the like. For example, if a failure code indicates unreachable or that a timeout has occurred, the scoring system may not increase the active server connection establishment failure score. If both ping and traceroute (e.g., for a next to last hop and a last hop) have not responded, the scoring system may increase the active server connection establishment failure score (e.g., indicating that the server device or the application is at fault). If the ping responded or the traceroute (e.g., for the next to last hop or the last hop) responded, the scoring system may increase the active server connection establishment failure score (e.g., indicating that the server device or the application is at fault). In some implementations, since a failure code is fatal, the scoring system may increase the active server connection establishment failure score by a maximum quantity (e.g., 10.0).

The active delay score may provide a measure of delays associated with the network. For example, a significant increase in server device delays is a noteworthy anomaly, and exceptionally high absolute server device delays are also noteworthy. An increase in delays associated with the server device may be caused by load/utilization of the server device, improper load balancing of the server device, application updates/changes associated with the server device, degraded infrastructure (e.g., virtual machine resource contention) associated with the server device, back-end issues associated with the server device, and/or the like. The scoring system may utilize data from the cURL service, the ping service, the traceroute service, the multi-step web service, other non-web tests, and/or the like to calculate the active delay score. The data from the services may include a sum of minimum across redirects, a maximum of minimum across redirects, minimum RTT alarms, and/or the like.

The scoring system may utilize a first model (e.g., an absolute model) and a second model (e.g., an anomaly-based machine learning model) to calculate the active delay score. The first model may assign a maximum value (e.g., 7.0) to the active delay score, may assign a minimum delay value (e.g., 4000 ms), and may assign a maximum delay value (e.g., 60,000 ms) based on effects of the scores on the end user experience (e.g., as determined by the scoring system). The scoring system may calculate an average RTND by dividing the RTND metric by the connections metric. If the average RTND is greater than the maximum delay value (e.g., 60,000), the scoring system may assign the maximum value (e.g., 7.0) to the active delay score. If the average RTND is less than the minimum delay value (e.g., 4000), the scoring system may assign a zero (0.0) value to the active delay score. If the average RTND is greater than the minimum delay value (e.g., 4000) and less than the maximum delay value (e.g., 60,000), the scoring system may calculate the active delay score as follows:

$$\text{Active delay score} = \text{Max value} \times \frac{\text{Avg } RTND - \text{Min } RTND \text{ value}}{\text{Max } RTND \text{ value} - \text{Min } RTND \text{ value}}.$$

With the second model, if a minimum RTT alarm has a good or indeterminate severity indicator or the sum of minimum across redirects is less than a value (e.g., 50 ms), the scoring system may not increase the active delay score. If the minimum RTT alarm has a severity warning, the scoring system may linearly or non-linearly increase the active delay score (e.g., from 0.0 to 5.0) based on a level of the severity warning. For example, if the sum of minimum across redirects is less than 100 ms, the scoring system may not increase the active delay score. If the sum of minimum across redirects is in a range of 100 ms and 4000 ms, the scoring system may scale down an increase in the active delay score with a multiplier (e.g., 0.0 to 0.6). If the sum of minimum across redirects is in a range of 4000 ms and 60,000 ms, the scoring system may scale down an increase in the active delay score with another multiplier (e.g., 0.6 to 1.0). If the minimum RTT alarm has severity critical, the scoring system may linearly or non-linearly increase the active delay score (e.g., from 0.0 to 10.0) based on a level of the severity critical. For example, if the sum of minimum across redirects is less than 50 ms, the scoring system may not increase the active delay score. If the sum of minimum across redirects is in a range of 50 ms and 4000 ms, the scoring system may scale down an increase in the active delay score with a multiplier (e.g., 0.0 to 0.8). If the sum of minimum across redirects is in a range of 4000 ms and 60,000 ms, the scoring system may scale down an increase in the active delay score with another multiplier (e.g., 0.8 to 1.0). In some implementations, the scoring system may increase the active delay score based on a maximum value determined by the first model or the second model (e.g., whichever is greatest).

Figure 1E:
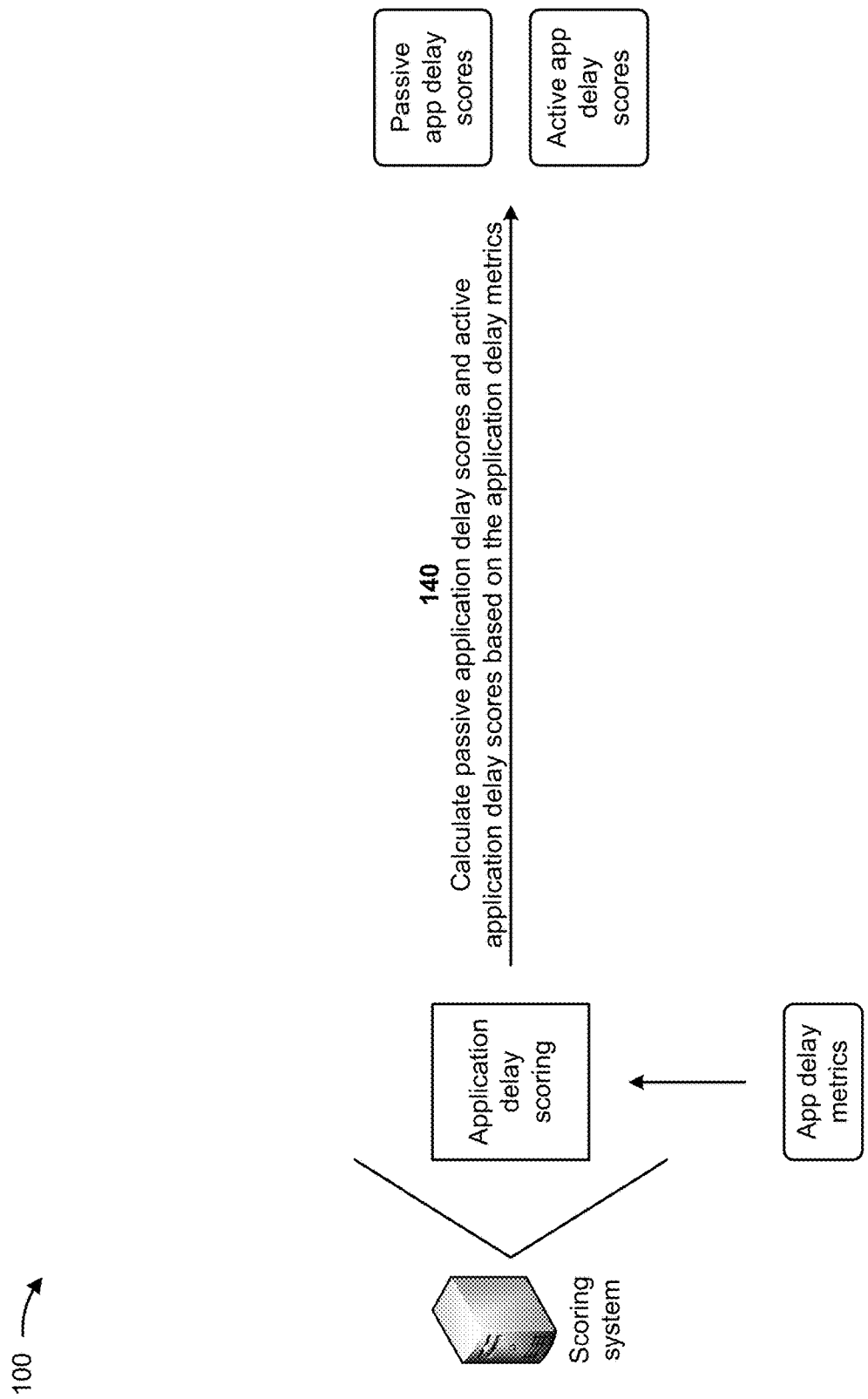

As shown in FIG. 1E, and by reference number 140, the scoring system may calculate passive application delay scores based on the application delay metrics. For example, the scoring system may calculate an application response time score, an application turn rate score, and/or an application data in flight score as the passive application delay scores. The scoring system may utilize the application response time metric, the total application turn delay metric, the total transaction time metric, the connections metric, the high application turn rate metric, the application turn RTND total metric, the application data in-flight metric, the transfer opportunity delay metric, and/or the like, to calculate the application response time score, the application turn rate score, and/or the application data in flight score.

The application response time score may provide a measure of application delays, experienced by the client device and/or the server device, at a beginning of every application turn. A total transaction time may be included in the application response time score, and may include an amount of time from a first client device data packet to a last server device data packet, and any application delay at the client device. The scoring system may assign a maximum value (e.g., 4.0) to the application response time score based on an effect of the score on the end user experience (e.g., as determined by the scoring system). The scoring system may calculate an initial application response time score based on a sum of all application turn delays measurements. The scoring system may linearly or non-linearly assign the application response time score based on the application turn delays (e.g., a delay of two seconds may be assigned a score of 0.01, a delay of thirty second may be assigned a score of 4.0, and/or the like). The scoring system may scale the application response time score based on a ratio of the application turn delays and the transaction time. The ratio may linearly or non-linearly assign a scale factor from a first ratio (e.g., 25% may assign a 0.0 scale factor) to a second ratio (e.g., 75% may assign a 1.0 scale factor). For ratios below the first ratio, the scoring system may assign a zero value (0.0) to the application response time score. For ratios above the second ratio, the scoring system may assign the maximum value (e.g., 4.0) to the application response time score based on an effect of the score on the end user experience (e.g., as determined by the scoring system).

The application turn rate score may provide a measure of impacts that round trip network delays have on a connection. The application turn rate score may indicate that the application includes many application turns which cause the application to operate inefficiently and create longer wait times. The scoring system may assign a maximum value (e.g., 5.0) to the application turn rate score based on an effect of the score on the end user experience (e.g., as determined by the scoring system). The scoring system may increase the application turn rate score if the scoring system determines that a cumulative application turn overhead (e.g., determined by multiplying an application turn count and the RTND) is high (e.g., greater than two seconds), a quantity of application turns for a connection is high (e.g., greater than ten), the RTND is high (e.g., greater than one millisecond), and a ratio of the application turn overhead to a total wait time is high (e.g., greater than twenty percent).

The application data in flight score may provide a measure of an amount of time the application should have been keeping data in flight. The application data in flight score may indicate a delay caused by the application when the application could have used the network to transfer data. The scoring system may assign a maximum value (e.g., 4.0) to the application data in flight score based on an effect of the score on the end user experience (e.g., as determined by the scoring system). The scoring system may increase the application data in flight score if the scoring system determines that a number of unacknowledged bytes in flight go to zero during a data transfer, more data is transmitted in a same direction (e.g., a client device direction or a server device direction) without another request being identified, an inter-packet time is abnormally large (e.g., greater than ten milliseconds), and a cumulative transfer opportunity delay (e.g., a time that data should have been in flight, as determined based on adding the RTND and a time that unacknowledged bytes are in flight) is high (e.g., greater than two seconds). The scoring system may increase the application data in flight score as the cumulative transfer opportunity delay increases.

As further shown in FIG. 1E, and by reference number 140, the scoring system may calculate active application delay scores based on the application delay metrics. For example, the scoring system may calculate an application unavailable score and/or an application errors score as the active application delay scores. The scoring system may utilize the application response time metric, the total application turn delay metric, the total transaction time metric, the connections metric, the high application turn rate metric, the application turn RTND total metric, the application data in-flight metric, the transfer opportunity delay metric, and/or the like, to calculate the application unavailable score and/or the application errors score.

The application unavailable score may provide a measure of delays associated with the application being unavailable. There may be detectable cases where the application is unavailable for reasons not clearly caused by the network or the server device. For such cases, the unavailable application may be classified as being caused by the application. The scoring system may utilize data from the cURL service, the ping service, the traceroute service, the multi-step web service, the other non-web test service, and/or the like to calculate the application unavailable score. The data from the services may include received failure codes, codes indicating no failure, Boolean data indicating whether a ping or a traceroute last hop was successful, Boolean data indicating that a ping or a traceroute last hop has never been successful, and/or the like. For example, if a failure code indicates that a domain name service (DNS) lookup failed, the scoring system may not increase the application unavailable score. If a failure code indicates that an associated failure is present, the scoring system may increase the application unavailable score by a maximum quantity (e.g., 10.0).

The application errors score may provide a measure of delays associated with the application errors. There may be detectable cases where the application is experiencing errors for reasons not clearly caused by the network or the server device. For such cases, the errors may be classified as being caused by the application. The scoring system may utilize data from the cURL service, the ping service, the traceroute service, the multi-step web service, the other non-web test service, and/or the like to calculate the application unavailable score. The data from the services may include received failure codes, codes indicating no failure, Boolean data indicating whether a ping or a traceroute last hop was successful, Boolean data indicating that a ping or a traceroute last hop has never been successful, and/or the like. For example, if a failure code indicates a particular code (e.g., "9," "3002," "3200-3599," and/or the like), the scoring system may increase the application errors score. If a failure code indicates that there are too many redirects (e.g., more than a threshold quantity of redirects), that a redirect failed, and/or that there are particular HTTP errors (e.g., HTTP errors 200-599), the scoring system may increase the application errors score.

Figure 1F:
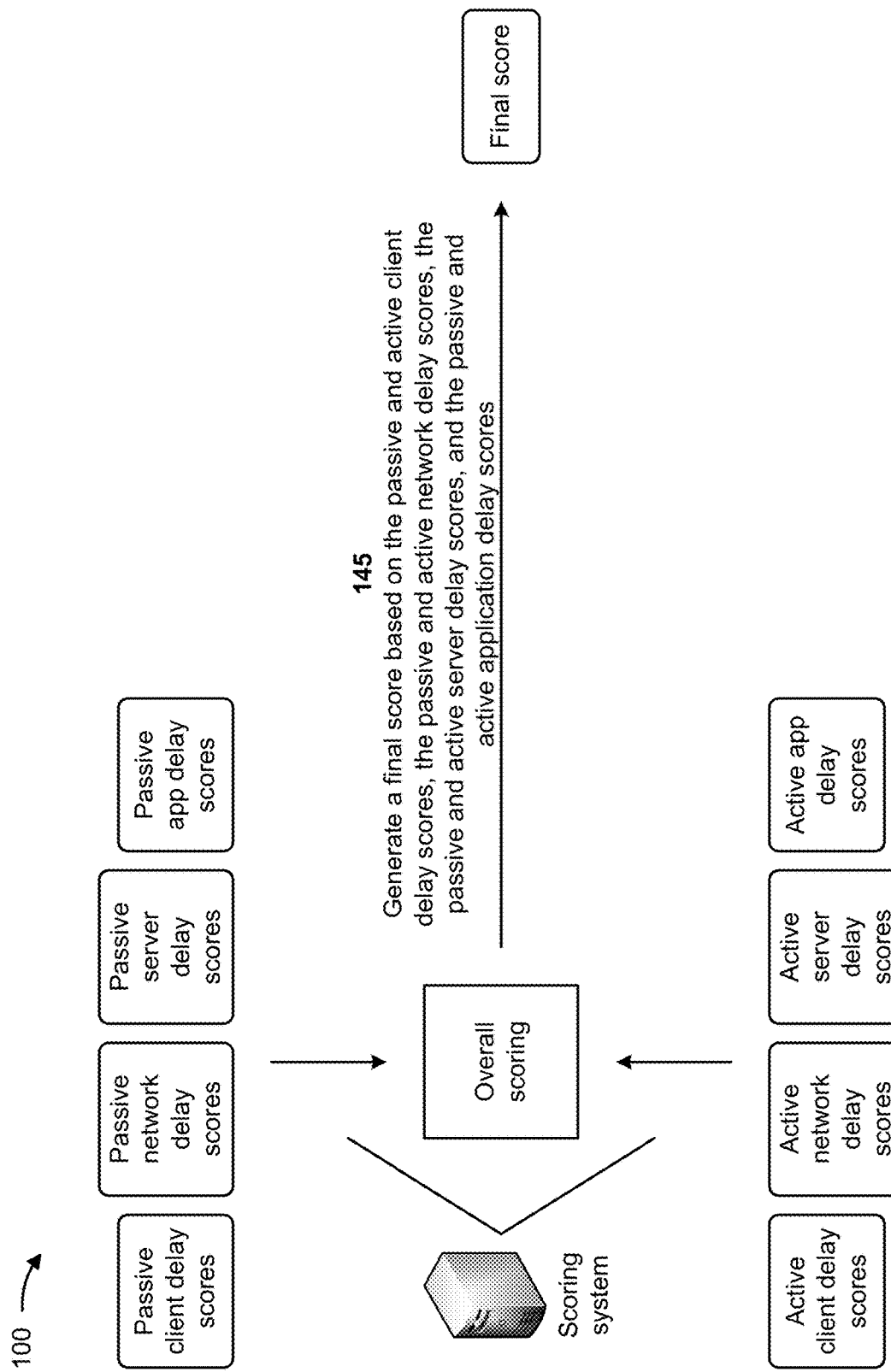

As shown in FIG. 1F, and by reference number 145, the scoring system may generate a final score (e.g., a final end user experience (EUE) score) based on the passive and active client delay scores, the passive and active network delay scores, the passive and active server delay scores, and the passive and active application delay scores. In some implementations, the scoring system may set an initial score to a particular value (e.g., 10.0), and may deduct the passive and active client delay scores, the passive and active network delay scores, the passive and active server delay scores, and the passive and active application delay scores, from the particular value, to generate the final score. In some implementations, the scoring system may calculate a final passive score based on the passive client delay scores, the passive network delay scores, the passive server delay scores, and the passive application delay scores, and may calculate a final active score based on the active client delay scores, the active network delay scores, the active server delay scores, and the active application delay scores. The scoring system may combine the final passive score and the final active score to determine the final score.

The scoring system may utilize the client exhausted windows score as the passive client delay scores. The scoring system may add the network RTND score, the network connection establishment failure score, the network connection establishment delay score, the network retransmissions score, and the network slow data transfer rate score to determine the passive network delay scores. The scoring system may add the server exhausted windows score, the server connection establishment failure score, and the server connection establishment delay score to determine the passive server delay scores. The scoring system may add the application response time score, the application turn rate score, and the application data in flight score to determine the passive application delay scores.

The scoring system may determine the final score based on a scale (e.g., a scale from 0.0 to 10.0), and may determine the end user experience based on the final score. The scoring system may determine that a final score of less than or equal to a particular value (e.g., 5.0) indicates a poor end user experience caused by one or more of the client device, the server device, the application, or the network. The scoring system may determine that a final score between a particular range (e.g., 5.1 and 8.0) indicates a marginal end user experience caused by one or more of the client device, the server device, the application, or the network. The scoring system may determine that a final score of greater than a particular value (e.g., 8.0) indicates a good end user experience involving one or more of the client device, the server device, the application, or the network.

The scoring system may determine the final score on a different scale (e.g., a scale from 0 to 100), where a final score of less than or equal to a particular value (e.g., 50) indicates a poor end user experience, a final score within a particular range (e.g., between 51 and 80) indicates a marginal end user experience, and a final score of greater than a particular value (e.g., 80) indicates a good end user experience.

The scoring system may define the passive and active client delay scores, the passive and active network delay scores, the passive and active server delay scores, and the passive and active application delay scores so that the scoring system can quantify an impact of one or more metrics on one or more of the passive and active client delay scores, one or more of the passive and active network delay scores, one or more of the passive and active server delay scores, and/or one or more of the passive and active application delay scores.

The scoring system may utilize the received metrics and/or auxiliary information to bias the passive and active client delay scores, the passive and active network delay scores, the passive and active server delay scores, and/or the passive and active application delay scores toward a particular area. For example, if the scoring system determines that the server device is experiencing zero windows, then the scoring system may determine that the zero windows indicate server device slowness. However, the scoring system may, instead, determine that such slowness is due to the application rather than and the server device. In another example, if the scoring system determines that the server device includes an unusually high number of connections, the scoring system may bias the passive and active application delay scores toward the passive and active server delay scores.

In some implementations, the scoring system may train one or more machine learning models (e.g., to generate one or more trained machine learning models) by providing historical metrics and historical final scores to the one or more machine learning models, and receiving predictions of rules (e.g., rules explaining the historical final scores given the historical metrics) based on providing the historical metrics and the historical final scores to the one or more machine learning models. Based on the predictions of rules, the scoring system may update the one or more machine learning models, and may provide the historical metrics and the historical final scores to the updated one or more machine learning models. The scoring system may repeat this process until correct predictions of rules are generated by the one or more machine learning models. The scoring system may process one or more of the metrics, with the one or more machine learning models, to generate previously unknown final scores. The machine learning models may include one or more of a support vector machine model, a linear regression model, a least absolute shrinkage and selection operator (Lasso) regression model, a Ridge regression model, an Elastic Net model, a k-nearest neighbor model, and/or the like.

The scoring system may calculate the passive and active client delay scores, the passive and active network delay scores, the passive and active server delay scores, and the passive and active application delay scores based on the metrics described herein and/or based on other metrics. For example, the scoring system may calculate the passive and active client delay scores, the passive and active network delay scores, the passive and active server delay scores, and/or the passive and active application delay scores based on other metrics, such as comparative or baseline information associated with the client device, the server device, the network, and/or the application; rules derived from machine learning; error codes associated with the client device, the server device, the network, and/or the application; detection of potential security threats associated with the client device, the server device, the network, and/or the application; higher level measurements (e.g., a connection count of the serve device dramatically increases over a baseline, aggregate many connections together rather than using a single connection, etc.), unified communications (e.g., voice of Internet protocol (VoIP) and video over IP), and/or the like.

The scoring system may enable a user of the scoring system to define one or more other metrics to utilize in the calculation of the passive and active client delay scores, the passive and active network delay scores, the passive and active server delay scores, and/or the passive and active application delay scores. For example, the scoring system may provide a user interface (e.g., for display) that enables the user to define the one or more other metrics. In such implementations, the scoring system may enable the user (e.g., via the user interface) to configure maximum values (e.g., thresholds) for one or more of the passive and active client delay scores, one or more of the passive and active network delay scores, one or more of the passive and active server delay scores, and/or one or more of the passive and active application delay scores. In this way, the scoring system may enable the user to provide more metrics for the calculation of the final score, which may improve the calculation of the final score.

The scoring system may differently weight one or more of the passive and active client delay scores, one or more of the passive and active network delay scores, one or more of the passive and active server delay scores, and/or one or more of the passive and active application delay scores when calculating the final score. The scoring system may apply different weights to one or more of the passive and active client delay scores, one or more of the passive and active network delay scores, one or more of the passive and active server delay scores, and/or one or more of the passive and active application delay scores. The scoring system may apply the different weights based on adjusting the maximum values (e.g., thresholds) for one or more of the passive and active client delay scores, one or more of the passive and active network delay scores, one or more of the passive and active server delay scores, and/or one or more of the passive and active application delay scores. The scoring system may determine the different weights based on historical metrics associated with the client device, the server device, the network, and the application. For example, assume that the historical metrics indicate that the end user experience is degraded a first percentage (e.g., 10%) by the client device, a second percentage (e.g., 30%) by the server device, a third percentage (e.g., 40%) by the network, and a fourth percentage (e.g., 20%) by the application. In such an example, the scoring system may apply a weight of 0.1 to the client delay score, a weight of 0.3 to the server delay scores, a weight of 0.4 to the network delay scores, and a weight of 0.2 to the application delay scores when calculating the final score.

In another example, if one active test is running in a location with 1,000 end users, and a similar active test is running in a location with 10 end users, the former may weight more heavily than the latter based on manually or automatically configured weighting information. As a corollary, if passive EUE measures 1,000 people and there is only 1 active test, without the weighting, the active test would only represent 1/1001 of all measurements and affect the final score accordingly. With the weighting of 1000, the active test could represent 1000/2000 of all measurements, thereby giving due attention to the population that the active test represents without requiring passive monitoring in that location.

The scoring system may aggregate the determined scores at a level, such as an overall site score, a subnet score, an application score, a server device score, a network score, and/or the like. The aggregation may include an average of the scores, or may be determined based on weighting, statistical analysis, baselining, and/or the like. Such an aggregated score may provide a top-to-bottom workflow to highlight any sites, subnets, applications, server devices, networks, and/or the like, that are experiencing systemic problems and deserve attention. As a user drills down into the aggregated score, the scoring system may provide a next level of detail to narrow down a root cause of a problem.

The scoring system may correlate the scores based on time and/or space. For example, if the server device is associated with a poor score for a particular client device, the scoring system can isolate a time period of poor performance, and determine other server devices with which the particular client device was interacting during that time period. The scoring system may utilize this information to associate specific back-end communications as a cause of trouble for the particular client device during the time period.

The scoring system may utilize phase-in and/or phase-out ramps for the delay scores, described herein, in order provide fewer delay scores that are exactly zero or ten, as well as to provide a total ordering among metrics that are beyond an upper end of a scoring threshold. In some implementations, the scoring system may analyze delay scores in two or more different ways, and may utilize a maximum score of the two different ways.

Figure 1G:
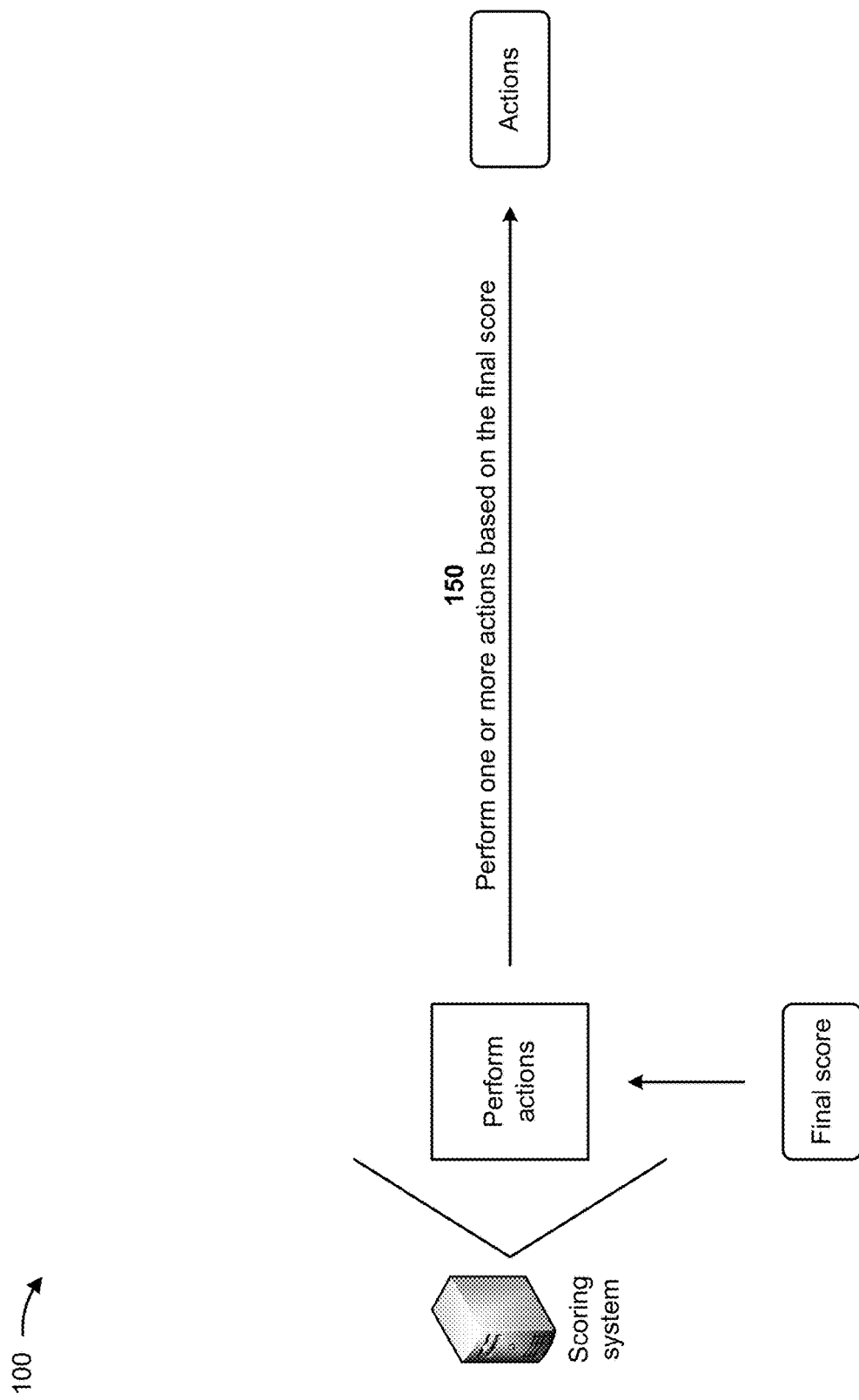

As shown in FIG. 1G, and by reference number 150, the scoring system may perform one or more actions based on the final score. For example, the scoring system may perform one or more actions based on the final score, the passive and active client delay scores, the passive and active network delay scores, the passive and active server delay scores, and/or the passive and active application delay scores. The scoring system may generate and display information associated with the final score, the passive and active client delay scores, the passive and active network delay scores, the passive and active server delay scores, and the passive and active application delay scores, information indicating whether the final score indicates a poor end user experience, a marginal end user experience, a good end use experience, and/or the like.

The scoring system may highlight the information indicating the final score via different text sizes, different text fonts, italicizing, bolding, different colors, and/or the like. The highlighting of the information indicating the final score may provide an indication of whether the final score is poor, marginal, good, and/or the like. For example, the scoring system may generate a red-colored final score when the final score is poor, a yellow-colored final score when the final score is marginal, and a green-colored final score when the final score is good, and/or the like. In this way, the scoring system can visually provide a quick way to determine whether the final is poor, marginal, or good.

The scoring system may generate information indicating the final score, a total of the passive and active client delay scores, a total of the passive and active network delay scores, a total of the passive and active server delay scores, and a total of the passive and active application delay scores. The information may be provided for display and may be selectable by a user of the scoring system (e.g., an entity responsible for the client device, the server device, the application, and/or the network). For example, the user may select the total of the passive and active client delay scores, and the scoring system may provide information indicating each of the passive and active client delay scores making up the total of the passive and active client delay scores. In another example, the user may select the total of the passive and active network delay scores, and the scoring system may provide information indicating each of the passive and active network delay scores making up the total of the passive and active network delay scores. In still another example, the user may select the total of the passive and active server delay scores, and the scoring system may provide information indicating each of the passive and active server delay scores making up the total of the server delay scores. In a further example, the user may select the total of the passive and active application delay scores, and the scoring system may provide information indicating each of the passive and active application delay scores making up the total of the passive and active application delay scores. In this way, the user may drill down through the information in order to determine which scores had the most impact on the final score. For example, if the server delay scores are high, the user may drill down into the server delay scores to determine which server delay score contributed the most to the high server delay scores.

The scoring system may identify one or more issues in the client device based on the passive and active client delay scores, and may determine one or more actions to the correct the one or more issues, such as restart the client device, provide updated software to the client device, remove software from the client device, add hardware (e.g., processors, memory, etc.) to the client device, and/or the like. The scoring system may automatically perform the one or more actions, or may cause the one or more actions to be performed. Performance of the one or more actions may modify (e.g., reduce) the passive and active client delay scores.

The scoring system may identify one or more issues in the server device based on the passive and active server delay scores, and may determine one or more actions to the correct the one or more issues, such as restart the server device, provide updated software to the server device, remove software from the server device, replace the server device, add hardware (e.g., processors, memory, etc.) to the server device, and/or the like. The scoring system may automatically perform the one or more actions, or may cause the one or more actions to be performed (e.g., dispatch a technician to perform an action). Performance of the one or more actions may modify (e.g., reduce) the passive and active server delay scores.

The scoring system may identify one or more issues in the network based on the passive and active network delay scores, and may determine one or more actions to the correct the one or more issues, such as restart one or more network devices, provide updated software to one or more network devices, remove software from one or more network devices, replace one or more network devices, add hardware (e.g., processors, memory, etc.) to one or more network devices, increase network bandwidth, add one or more network devices to the network, and/or the like. The scoring system may automatically perform the one or more actions, or may cause the one or more actions to be performed. Performance of the one or more actions may modify (e.g., reduce) the passive and active network delay scores.

The scoring system may identify one or more issues in the application based on the passive and active application delay scores, and may determine one or more actions to the correct the one or more issues, such as restart the application, provide updated software for the application, remove the application from the server device, replace the application with a different application, and/or the like. The scoring system may automatically perform the one or more actions, or may cause the one or more actions to be performed. Performance of the one or more actions may modify (e.g., reduce) the application delay scores.

Figure 1H:
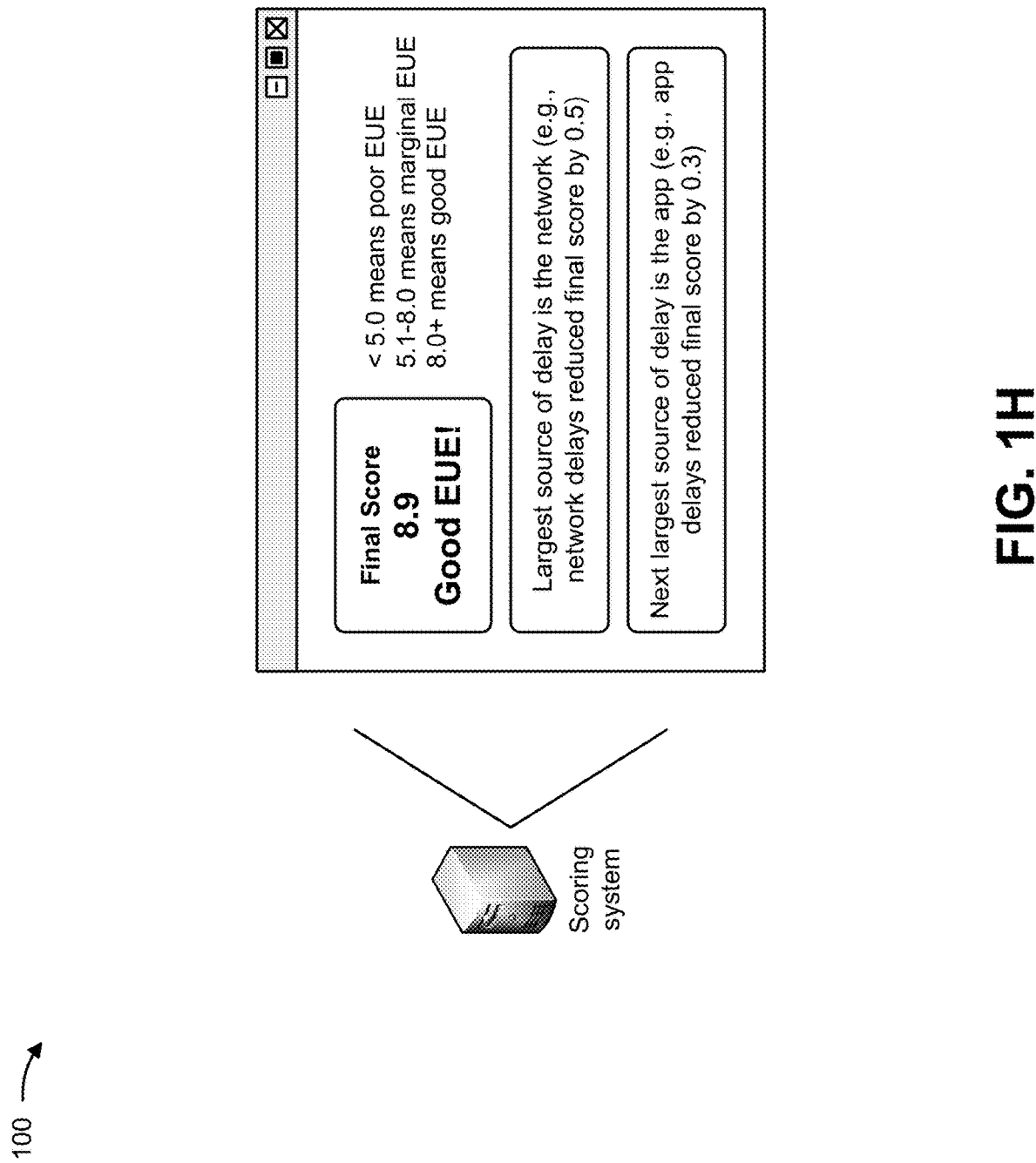

As shown in FIG. 1H, and by reference number 155, the scoring system may generate a user interface based on the final score, the passive and active client delay scores, the passive and active network delay scores, the passive and active server delay scores, and/or the passive and active application delay scores. For example, the user interface may include information indicating the final score of "8.9," information indicating that the final score is a good EUE, information indicating ranges for poor EUE, marginal EUE, and good EUE, information indicating that a largest source of delay is the network (e.g., since network delays reduced the final score by 0.5), information indicating that a next largest source of delay is the application (e.g., since application delays reduced the final score by 0.3), and/or the like. Such information may be provided to an entity responsible for the client device, the server device, the application, and/or the network, and may be utilized to correct any problems identified (e.g., by the scores) with the client device, the server device, the application, and/or the network.

In this way, the scoring system determines an EUE score based on client device, network, server device, and application metrics. The scoring system may calculate passive client device delay scores, passive network delay scores, passive server device delay scores, and passive application scores based on passive (e.g., packet-based) metrics, and may calculate a final passive score based on the passive client device delay scores, the passive network delay scores, the passive server device delay scores, and the passive application scores. The scoring system may calculate active client device delay scores, active network delay scores, active server device delay scores, and active application scores based on active metrics, and may calculate a final active score based on the active client device delay scores, the active network delay scores, the active server device delay scores, and the active application scores. The scoring system may calculate an EUE score based on the final passive score and the final active score, and may modify the client device, the network, the server device, and/or the application based on the EUE score. This, in turn, conserves computing resources, networking resources, and/or the like that would otherwise have been consumed in utilizing useless metrics to incorrectly estimate EUE quality; utilizing an incorrectly estimated EUE quality to incorrectly modify a client device, a server device, an application, and/or a network; further degrading the EUE quality based on utilizing the incorrectly estimated EUE quality; and/or the like.

In some implementations, the scoring system may handle thousands, millions, billions, or more metrics received from hundreds, thousands, or more client devices, server devices, applications, and/or networks, and thus, addresses a big data issue. Furthermore, the scoring system merges together metrics of various dimensionalities into a single, dimensionless metric that is easy to understand, increases an ability to determine whether an end user experience is good or bad (e.g., without manual correlation), and/or the like. Implementations described herein provide an EUE scoring system that may be applied across a variety of domains.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
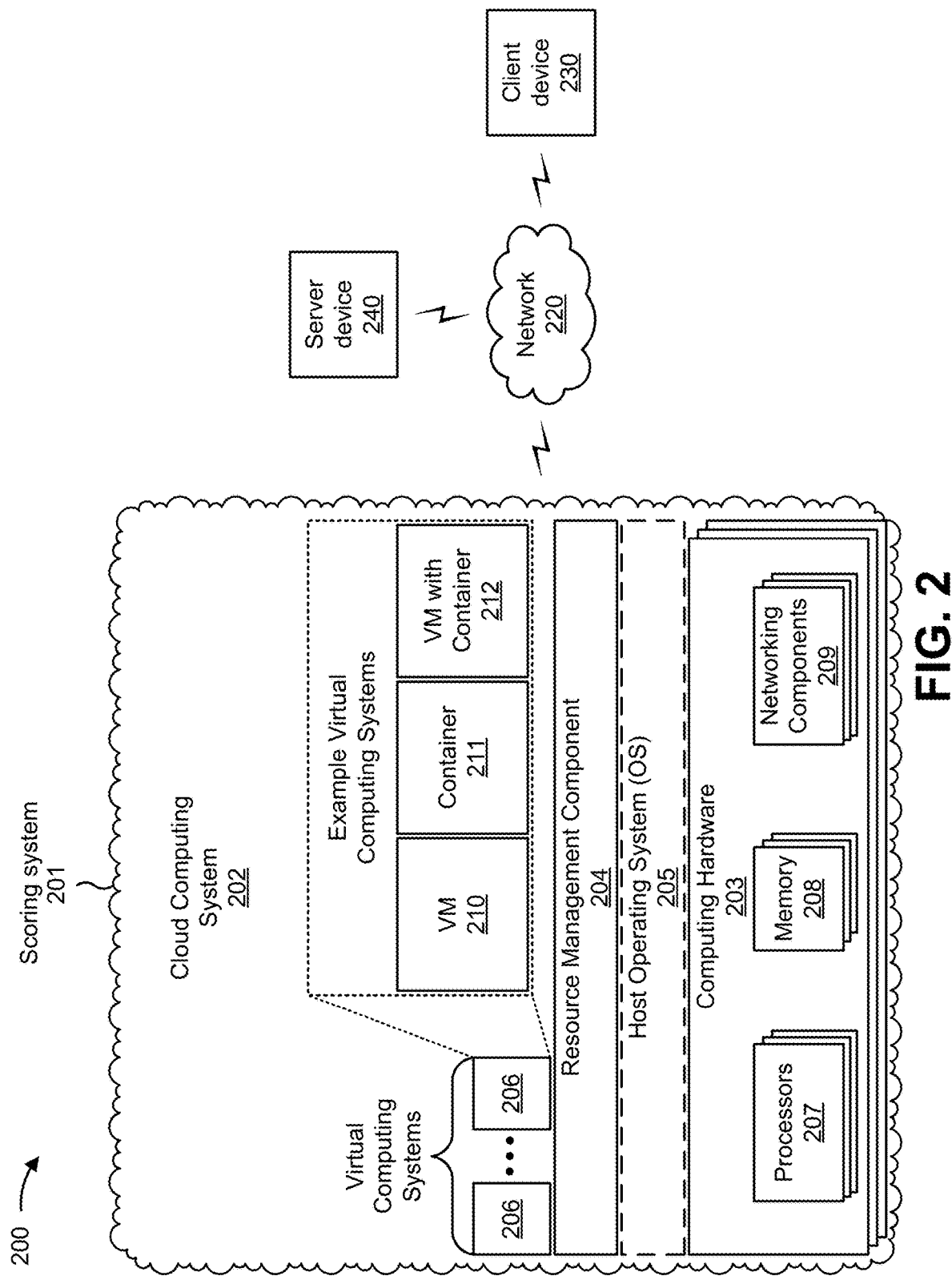
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a scoring system 201, which may include one or more elements of and/or may execute within a cloud computing system 202. The cloud computing system 202 may include one or more elements 203-213, as described in more detail below. As further shown in FIG. 2, the environment 200 may include a network 220, a client device 230, and/or a server device 240. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of the computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, the virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the scoring system 201 may include one or more elements 203-213 of the cloud computing system 202, may execute within the cloud computing system 202, and/or may be hosted within the cloud computing system 202, in some implementations, the scoring system 201 may not be cloud-based (e.g., may be implemented outside of a cloud computing system) or may be partially cloud-based. For example, the scoring system 201 may include one or more devices that are not part of the cloud computing system 202, such as a device 300 of FIG. 3, which may include a standalone server or another type of computing device. The scoring system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or the like, and/or a combination of these or other types of networks. The network 220 enables communication among the devices of the environment 200.

The client device 230 includes one or more devices capable of receiving, generating, storing, processing, and/or providing information, as described elsewhere herein. The client device 230 may include a communication device and/or a computing device. For example, the client device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The server device 240 includes one or more devices capable of receiving, generating, storing, processing, providing, and/or routing information, as described elsewhere herein. The server device 240 may include a communication device and/or a computing device. For example, the server device 240 may include a server, such as an application server, a client server, a web server, a database server, a host server, a proxy server, a virtual server (e.g., executing on computing hardware), or a server in a cloud computing system. In some implementations, the server device 240 includes computing hardware used in a cloud computing environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
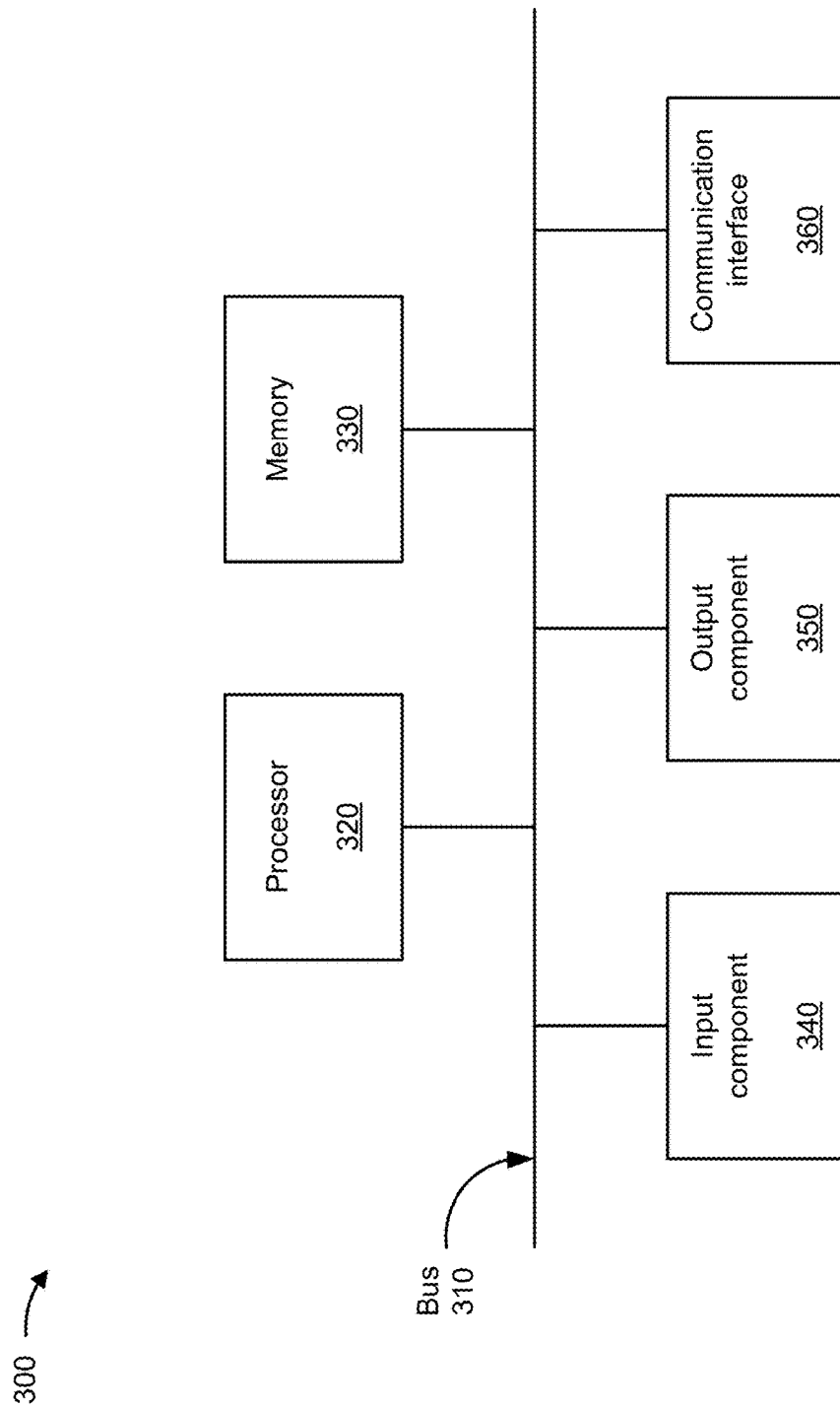
FIG. 3 is a diagram of example components of one or more devices of FIG. 2.

FIG. 3 is a diagram of example components of a device 300, which may correspond to the scoring system 201, the client device 230, and/or the server device 240. In some implementations, the scoring system 201, the client device 230, and/or the server device 240 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for determining an EUE score based on client device, network, server device, and application metrics. In some implementations, one or more process blocks of FIG. 4 may be performed by a device (e.g., the scoring system 201). In some implementations, one or more process blocks of FIG. 4 may be performed by another device or a group of devices separate from or including the device. Additionally, or alternatively, one or more process blocks of FIG. 4 may be performed by one or more components of the device 300, such as the processor 320, the memory 330, the input component 340, the output component 350, and/or the communication interface 360.

As shown in FIG. 4, process 400 may include receiving client delay metrics associated with a client device of a network (block 405). For example, the device may receive client delay metrics associated with a client device of a network, as described above. In some implementations, the client delay metrics include one or more of a window exhaustion metric, a bulk data transfer exhausted window metric, or a bulk data transfer time metric.

As further shown in FIG. 4, process 400 may include receiving network delay metrics associated with the network (block 410). For example, the device may receive network delay metrics associated with the network, as described above. In some implementations, the network delay metrics include one or more of a round trip network delay metric, a connections metric, connection establishment failure metrics, connection establishment delay metrics, a retransmissions metric, a data transfer time metric, a data transfer retransmission time metric, a data transfer bytes metric, a retransmitted packets metric, a total packets metric, or a data packets metric.

As further shown in FIG. 4, process 400 may include receiving server delay metrics associated with a server device of the network (block 415). For example, the device may receive server delay metrics associated with a server device of the network, as described above. In some implementations, the server delay metrics include one or more of a window exhaustion metric, a bulk data transfer exhausted window metric, a bulk data transfer time metric, a connections metric, connection establishment failure metrics, or connection establishment delay metrics.

As further shown in FIG. 4, process 400 may include receiving application delay metrics associated with an application provided by the server device (block 420). For example, the device may receive application delay metrics associated with an application provided by the server device, as described above.

As further shown in FIG. 4, process 400 may include calculating one or more passive client delay scores and one or more active client delay scores based on the client delay metrics and the application delay metrics (block 425). For example, the device may calculate one or more passive client delay scores and one or more active client delay scores based on the client delay metrics and the application delay metrics, as described above. In some implementations, calculating the one or more active client delay scores based on the client delay metrics and the application delay metrics includes processing the client delay metrics and the application delay metrics, with a model, to calculate a first active client delay score; processing the client delay metrics and the application delay metrics, with a machine learning model, to calculate a second active client delay score; and selecting a greater of the first active client delay score or the second active client delay score as the one or more active client delay scores.

As further shown in FIG. 4, process 400 may include calculating one or more passive network delay scores and one or more active network delay scores based on the network delay metrics (block 430). For example, the device may calculate one or more passive network delay scores and one or more active network delay scores based on the network delay metrics, as described above. In some implementations, calculating the one or more active network delay scores based on the network delay metrics includes processing the network delay metrics, with a model, to calculate a first active network delay score; processing the network delay metrics, with a machine learning model, to calculate a second active network delay score; and selecting a greater of the first active network delay score or the second active network delay score as the one or more active network delay scores.

In some implementations, calculating the one or more active network delay scores based on the network delay metrics includes calculating an active network connection establishment failure score based on the network delay metrics, calculating an active delay score based on the network delay metrics, calculating an active slow network for data transfer score based on the network delay metrics, and calculating an active network connection establishment delay score based on the network delay metrics, wherein the active network connection establishment failure score, the active delay score, the active slow network for data transfer score, and the network connection establishment delay score correspond to the one or more active network delay scores.

As further shown in FIG. 4, process 400 may include calculating one or more passive server delay scores and one or more active server delay scores based on the server delay metrics and the application delay metrics (block 435). For example, the device may calculate one or more passive server delay scores and one or more active server delay scores based on the server delay metrics and the application delay metrics, as described above. In some implementations, calculating the one or more active server delay scores based on the server delay metrics and the application delay metrics includes processing the server delay metrics and the application delay metrics, with a model, to calculate a first active server delay score; processing the network delay metrics and the application delay metrics, with a machine learning model, to calculate a second active server delay score; and selecting a greater of the first active server delay score or the second active server delay score as the one or more active server delay scores.

In some implementations, calculating the one or more active server delay scores based on the server delay metrics and the application delay metrics includes calculating an active server connection establishment failure score based on the server delay metrics and the application delay metrics, and calculating an active delay score based on the server delay metrics and the application delay metrics, wherein the one or more active server delay scores correspond to the active server connection establishment failure score and the active delay score.

As further shown in FIG. 4, process 400 may include calculating one or more passive application delay scores and one or more active application delay scores based on the application delay metrics (block 440). For example, the device may calculate one or more passive application delay scores and one or more active application delay scores based on the application delay metrics, as described above. In some implementations, calculating the one or more active application delay scores based on the application delay metrics includes calculating an application unavailable score based on the application delay metrics, and calculating an application errors score based on the application delay metrics, wherein the one or more active application delay scores correspond to the application unavailable score and the application errors score.

As further shown in FIG. 4, process 400 may include calculating an end user experience score based on the one or more passive client delay scores, the one or more active client delay scores, the one or more passive network delay scores, the one or more active network delay scores, the one or more passive server delay scores, the one or more active server delay scores, the one or more passive application delay scores, and the one or more active application delay scores (block 445). For example, the device may calculate an end user experience score based on the one or more passive client delay scores, the one or more active client delay scores, the one or more passive network delay scores, the one or more active network delay scores, the one or more passive server delay scores, the one or more active server delay scores, the one or more passive application delay scores, and the one or more active application delay scores, as described above.

In some implementations, calculating the end user experience score includes calculating a final passive score based on the one or more passive client delay scores, the one or more passive network delay scores, the one or more passive server delay scores, and the one or more passive application delay scores; calculating a final active score based on the one or more active client delay scores, the one or more active network delay scores, the one or more active server delay scores, and the one or more active application delay scores; and combining the final passive score and the final active score to calculate the end user experience score. In some implementations, the end user experience score provides an indication of an end user experience with the client device, the server device, the network, and the application.

As further shown in FIG. 4, process 400 may include performing one or more actions based on the end user experience score (block 450). For example, the device may perform one or more actions based on the end user experience score, as described above. In some implementations, performing the one or more actions includes one or more of modifying the client device to modify the one or more passive client delay scores or the one or more active client delay scores; modifying the network to modify the one or more passive network delay scores or the one or more active network delay scores; modifying the server device to modify the one or more passive server delay scores or the one or more active server delay scores; or modifying the application to modify the one or more passive application delay scores or the one or more active application delay scores.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  receiving, by a device, client delay metrics associated with a client device of a network;
  receiving, by the device, network delay metrics associated with the network;
  receiving, by the device, server delay metrics associated with a server device of the network;
  receiving, by the device, application delay metrics associated with an application provided by the server device;
  calculating, by the device and based on passive monitoring, one or more passive client delay scores;
  calculating, by the device and via active or synthetic testing, one or more active client delay scores based on the client delay metrics and the application delay metrics,
    wherein calculating the one or more active client delay scores based on the client delay metrics and the application delay metrics comprises:
      processing the client delay metrics and the application delay metrics, with a model, to calculate a first active client delay score; and
      processing the client delay metrics and the application delay metrics, with a machine learning model, to calculate a second active client delay score, and
    wherein the machine learning model comprises one or more of a support vector machine model, a linear regression model, a least absolute shrinkage and selection operator (Lasso) regression model, a Ridge regression model, an Elastic Net model, or a k-nearest neighbor model;
  calculating, by the device, one or more passive network delay scores and one or more active network delay scores based on the network delay metrics;
  calculating, by the device, one or more passive server delay scores and one or more active server delay scores based on the server delay metrics and the application delay metrics;
  calculating, by the device, one or more passive application delay scores and one or more active application delay scores based on the application delay metrics;
  calculating, by the device, an end user experience score based on the one or more passive client delay scores, the one or more active client delay scores, the one or more passive network delay scores, the one or more active network delay scores, the one or more passive server delay scores, the one or more active server delay scores, the one or more passive application delay scores, and the one or more active application delay scores; and
  performing, by the device, one or more actions based on the end user experience score.

2. The method of claim 1, wherein performing the one or more actions comprises one or more of:
  modifying the client device to modify the one or more passive client delay scores or the one or more active client delay scores;
  modifying the network to modify the one or more passive network delay scores or the one or more active network delay scores;

modifying the server device to modify the one or more passive server delay scores or the one or more active server delay scores; or modifying the application to modify the one or more passive application delay scores or the one or more active application delay scores.

3. The method of claim 1, wherein calculating the one or more active network delay scores based on the network delay metrics comprises:
processing the network delay metrics to calculate a first active network delay score;
processing the network delay metrics to calculate a second active network delay score; and
selecting a greater of the first active network delay score or the second active network delay score as the one or more active network delay scores.

4. The method of claim 1, wherein calculating the one or more active server delay scores based on the server delay metrics and the application delay metrics comprises:
processing the server delay metrics and the application delay metrics to calculate a first active server delay score; and
processing the network delay metrics and the application delay metrics to calculate a second active server delay score.

5. The method of claim 1, wherein calculating the one or more active application delay scores based on the application delay metrics comprises:
calculating an application unavailable score based on the application delay metrics; and
calculating an application errors score based on the application delay metrics,
wherein the one or more active application delay scores correspond to the application unavailable score and the application errors score.

6. The method of claim 1, wherein calculating the end user experience score comprises:
calculating a final passive score based on the one or more passive client delay scores, the one or more passive network delay scores, the one or more passive server delay scores, and the one or more passive application delay scores;
calculating a final active score based on the one or more active client delay scores, the one or more active network delay scores, the one or more active server delay scores, and the one or more active application delay scores; and
combining the final passive score and the final active score to calculate the end user experience score.

7. A device, comprising:
one or more memories; and
one or more processors, coupled to the one or more memories, configured to:
receive client delay metrics associated with a client device of a network;
receive network delay metrics associated with the network;
receive server delay metrics associated with a server device of the network;
receive application delay metrics associated with an application provided by the server device;
calculate, based on passive monitoring, one or more passive client delay scores;
calculate, via active or synthetic testing, one or more active client delay scores based on the client delay metrics and the application delay metrics,
wherein, to calculate the one or more active client delay scores based on the client delay metrics and the application delay metrics, the one or more processors are configured to:
process the client delay metrics and the application delay metrics, with a model, to calculate a first active client delay score; and
process the client delay metrics and the application delay metrics, with a machine learning model, to calculate a second active client delay score, and
wherein the machine learning model comprises one or more of a support vector machine model, a linear regression model, a least absolute shrinkage and selection operator (Lasso) regression model, a Ridge regression model, an Elastic Net model, or a k-nearest neighbor model;
calculate one or more passive network delay scores and one or more active network delay scores based on the network delay metrics;
calculate one or more passive server delay scores and one or more active server delay scores based on the server delay metrics and the application delay metrics;
calculate one or more passive application delay scores and one or more active application delay scores based on the application delay metrics;
calculate an end user experience score based on the one or more passive client delay scores, the one or more active client delay scores, the one or more passive network delay scores, the one or more active network delay scores, the one or more passive server delay scores, the one or more active server delay scores, the one or more passive application delay scores, and the one or more active application delay scores; and
provide the end user experience score for display.

8. The device of claim 7, wherein the end user experience score provides an indication of an end user experience with the client device, the server device, the network, and the application.

9. The device of claim 7, wherein the client delay metrics include one or more of a window exhaustion metric, a bulk data transfer exhausted window metric, or a bulk data transfer time metric.

10. The device of claim 7, wherein the one or more processors, to calculate the one or more active network delay scores based on the network delay metrics, are configured to:
calculate an active network connection establishment failure score based on the network delay metrics;
calculate an active delay score based on the network delay metrics;
calculate an active slow network for data transfer score based on the network delay metrics; and
calculate an active network connection establishment delay score based on the network delay metrics,
wherein the active network connection establishment failure score, the active delay score, the active slow network for data transfer score, and the active network connection establishment delay score correspond to the one or more active network delay scores.

11. The device of claim 7, wherein the one or more processors, to calculate the one or more active server delay scores based on the server delay metrics and the application delay metrics, are configured to:

calculate an active server connection establishment failure score based on the server delay metrics and the application delay metrics; and calculate an active delay score based on the server delay metrics and the application delay metrics, wherein the one or more active server delay scores correspond to the active server connection establishment failure score and the active delay score.

12. The device of claim 7, wherein the network delay metrics include one or more of a round trip network delay metric, a connections metric, connection establishment failure metrics, connection establishment delay metrics, a retransmissions metric, a data transfer time metric, a data transfer retransmission time metric, a data transfer bytes metric, a retransmitted packets metric, a total packets metric, or a data packets metric.

13. The device of claim 7, wherein the server delay metrics include one or more of a window exhaustion metric, a bulk data transfer exhausted window metric, a bulk data transfer time metric, a connections metric, connection establishment failure metrics, or connection establishment delay metrics.

14. A non-transitory computer-readable medium storing a set of instructions, the set of instructions comprising:

one or more instructions that, when executed by one or more processors of a device, cause the device to:

receive client delay metrics associated with a client device of a network;

receive network delay metrics associated with the network;

receive server delay metrics associated with a server device of the network;

receive application delay metrics associated with an application provided by the server device;

calculate, based on passive monitoring, one or more passive client delay scores;

calculate, via active or synthetic testing, one or more active client delay scores based on the client delay metrics and the application delay metrics, wherein the one or more instructions, that cause the device to calculate the one or more active client delay scores based on the client delay metrics and the application delay metrics, cause the device to:

process the client delay metrics and the application delay metrics, with a model, to calculate a first active client delay score; and process the client delay metrics and the application delay metrics, with a machine learning model, to calculate a second active client delay score, and wherein the machine learning model comprises one or more of a support vector machine model, a linear regression model, a least absolute shrinkage and selection operator (Lasso) regression model, a Ridge regression model, an Elastic Net model, or a k-nearest neighbor model;

calculate one or more passive network delay scores and one or more active network delay scores based on the network delay metrics;

calculate one or more passive server delay scores and one or more active server delay scores based on the server delay metrics and the application delay metrics;

calculate one or more passive application delay scores and one or more active application delay scores based on the application delay metrics;

calculate an end user experience score based on the one or more passive client delay scores, the one or more active client delay scores, the one or more passive network delay scores, the one or more active network delay scores, the one or more passive server delay scores, the one or more active server delay scores, the one or more passive application delay scores, and the one or more active application delay scores; and modify one or more of the client device, the network, the server device, or the application based on the end user experience score.

15. The non-transitory computer-readable medium of claim 14, wherein the one or more instructions, that cause the device to calculate the one or more active network delay scores based on the network delay metrics, cause the device to:

process the network delay metrics to calculate a first active network delay score;

process the network delay metrics to calculate a second active network delay score; and select a greater of the first active network delay score or the second active network delay score as the one or more active network delay scores.

16. The non-transitory computer-readable medium of claim 14, wherein the one or more instructions, that cause the device to calculate the one or more active server delay scores based on the server delay metrics and the application delay metrics, cause the device to:

process the server delay metrics and the application delay metrics to calculate a first active server delay score; and process the network delay metrics and the application delay metrics to calculate a second active server delay score.

17. The non-transitory computer-readable medium of claim 14, wherein the one or more instructions, that cause the device to calculate the one or more active application delay scores based on the application delay metrics, cause the device to:

calculate an application unavailable score based on the application delay metrics; and calculate an application errors score based on the application delay metrics, wherein the one or more active application delay scores correspond to the application unavailable score and the application errors score.

18. The non-transitory computer-readable medium of claim 14, wherein the one or more instructions, that cause the device to calculate the one or more active network delay scores based on the network delay metrics, cause the device to:

calculate an active network connection establishment failure score based on the network delay metrics;

calculate an active delay score based on the network delay metrics;

calculate an active slow network for data transfer score based on the network delay metrics; and calculate an active network connection establishment delay score based on the network delay metrics, wherein the active network connection establishment failure score, the active delay score, the active slow network for data transfer score, and the active network connection establishment delay score correspond to the one or more active network delay scores.

19. The device of claim 7, wherein, to calculate the one or more active client delay scores based on the client delay metrics and the application delay metrics, the one or more processors are further configured to:
  select one of the first active client delay score or the second active client delay score as one of the one or more active client delay scores.

20. The device of claim 7, wherein the model is an absolute model.

* * * * *